US009741183B2

(12) United States Patent
Matos et al.

(10) Patent No.: US 9,741,183 B2
(45) Date of Patent: Aug. 22, 2017

(54) SYSTEMS AND METHODS FOR OPTIMIZING DATA GATHERING IN A NETWORK OF MOVING THINGS

(71) Applicant: Veniam, Inc., Mountain View, CA (US)

(72) Inventors: Ricardo Matos, Oporto (PT); Joao Barros, Mountain View, CA (US); Joao Azevedo, Felgueiras (PT); Tiago Condeixa, Vagos (PT); Carlos Ameixieira, Oporto (PT)

(73) Assignee: VENIAM, INC, Mountain View, CA (US)

( * ) Notice: Subject to any disclaimer, the term of this patent is extended or adjusted under 35 U.S.C. 154(b) by 0 days.

(21) Appl. No.: 15/337,856

(22) Filed: Oct. 28, 2016

(65) Prior Publication Data

US 2017/0132853 A1    May 11, 2017

Related U.S. Application Data

(60) Provisional application No. 62/253,249, filed on Nov. 10, 2015.

(51) Int. Cl.
| | |
|---|---|
| *G01M 17/00* | (2006.01) |
| *G07C 5/00* | (2006.01) |
| *G07C 5/02* | (2006.01) |
| *H04W 48/20* | (2009.01) |
| *H04W 84/00* | (2009.01) |

(52) U.S. Cl.
CPC ............... *G07C 5/008* (2013.01); *G07C 5/02* (2013.01); *H04W 48/20* (2013.01); *H04W 84/005* (2013.01)

(58) Field of Classification Search
CPC .......... G07C 5/008; G07C 5/02; H04W 48/20
USPC ....... 701/31.5, 117–119; 455/456.1; 340/988
See application file for complete search history.

(56) References Cited

U.S. PATENT DOCUMENTS

| | | | |
|---|---|---|---|
| 6,401,027 B1 * | 6/2002 | Xu ...................... | G08G 1/0104 340/988 |
| 9,066,202 B2 * | 6/2015 | Dua ...................... | H04W 4/02 |
| 2011/0218759 A1 | 9/2011 | Jin | |
| 2012/0213121 A1 | 8/2012 | Stevens et al. | |
| 2014/0192722 A1 | 7/2014 | Krause et al. | |
| 2015/0185037 A1 | 7/2015 | Horvitz | |
| 2015/0264554 A1 * | 9/2015 | Addepalli ............. | H04W 4/046 370/328 |

OTHER PUBLICATIONS

International Search Report and Written Opinion corresponding to International Patent Application No. PCT/US2016/60965, dated Jan. 24, 2017.

* cited by examiner

*Primary Examiner* — Thomas G Black
*Assistant Examiner* — Luke Huynh
(74) *Attorney, Agent, or Firm* — McAndrews, Held & Malloy, Ltd.

(57) ABSTRACT

Systems and methods for optimizing data gathering in a network of moving things. As non-limiting examples, various aspects of this disclosure provide systems and methods for operating sensor systems and collecting data from sensor systems in a network resource-efficient manner.

28 Claims, 14 Drawing Sheets

SYSTEMS AND METHODS FOR OPTIMIZING DATA GATHERING IN A NETWORK OF MOVING THINGS

CROSS-REFERENCE TO RELATED APPLICATIONS/INCORPORATION BY REFERENCE

This patent application makes reference to, claims priority to, and claims benefit from U.S. Provisional Application Ser. No. 62/253,249, titled "Systems and Methods for Optimizing Data Gathering in a Network of Moving Things," filed on Nov. 10, 2015, which is hereby incorporated herein by reference in its entirety.

The present application is also related to U.S. Provisional Application Ser. No. 62/221,997, titled "Integrated Communication Network for a Network of Moving Things," filed on Sep. 22, 2015; U.S. Provisional Application Ser. No. 62/222,016, titled "Systems and Methods for Synchronizing a Network of Moving Things," filed on Sep. 22, 2015; U.S. Provisional Application Ser. No. 62/222,042, titled "Systems and Methods for Managing a Network of Moving Things," filed on Sep. 22, 2015; U.S. Provisional Application Ser. No. 62/222,066, titled "Systems and Methods for Monitoring a Network of Moving Things," filed on Sep. 22, 2015; U.S. Provisional Application Ser. No. 62/222,077, titled "Systems and Methods for Detecting and Classifying Anomalies in a Network of Moving Things," filed on Sep. 22, 2015; U.S. Provisional Application Ser. No. 62/222,098, titled "Systems and Methods for Managing Mobility in a Network of Moving Things," filed on Sep. 22, 2015; U.S. Provisional Application Ser. No. 62/222,121, titled "Systems and Methods for Managing Connectivity a Network of Moving Things," filed on Sep. 22, 2015; U.S. Provisional Application Ser. No. 62/222,135, titled "Systems and Methods for Collecting Sensor Data in a Network of Moving Things," filed on Sep. 22, 2015; U.S. Provisional Application Ser. No. 62/222,145, titled "Systems and Methods for Interfacing with a Network of Moving Things," filed on Sep. 22, 2015; U.S. Provisional Application Ser. No. 62/222,150, titled "Systems and Methods for Interfacing with a User of a Network of Moving Things," filed on Sep. 22, 2015; U.S. Provisional Application Ser. No. 62/222,168, titled "Systems and Methods for Data Storage and Processing for a Network of Moving Things," filed on Sep. 22, 2015; U.S. Provisional Application Ser. No. 62/222,183, titled "Systems and Methods for Vehicle Traffic Management in a Network of Moving Things," filed on Sep. 22, 2015; U.S. Provisional Application Ser. No. 62/222,186, titled "Systems and Methods for Environmental Management in a Network of Moving Things," filed on Sep. 22, 2015; U.S. Provisional Application Ser. No. 62/222,190, titled "Systems and Methods for Port Management in a Network of Moving Things," filed on Sep. 22, 2015; U.S. Provisional Patent Application Ser. No. 62/222,192, titled "Communication Network of Moving Things," filed on Sep. 22, 2015; U.S. Provisional Application Ser. No. 62/244,828, titled "Utilizing Historical Data to Correct GPS Data in a Network of Moving Things," filed on Oct. 22, 2015; U.S. Provisional Application Ser. No. 62/244,930, titled "Using Anchors to Correct GPS Data in a Network of Moving Things," filed on Oct. 22, 2015; U.S. Provisional Application Ser. No. 62/246,368, titled "Systems and Methods for Inter-Application Communication in a Network of Moving Things," filed on Oct. 26, 2015; U.S. Provisional Application Ser. No. 62/246,372, titled "Systems and Methods for Probing and Validating Communication in a Network of Moving Things," filed on Oct. 26, 2015; U.S. Provisional Application Ser. No. 62/250,544, titled "Adaptive Rate Control for Vehicular Networks," filed on Nov. 4, 2015; U.S. Provisional Application Ser. No. 62/273,878, titled "Systems and Methods for Reconfiguring and Adapting Hardware in a Network of Moving Things," filed on Dec. 31, 2015; U.S. Provisional Application Ser. No. 62/253,249, titled "Systems and Methods for Optimizing Data Gathering in a Network of Moving Things," filed on Nov. 10, 2015; U.S. Provisional Application Ser. No. 62/257,421, titled "Systems and Methods for Delay Tolerant Networking in a Network of Moving Things," filed on Nov. 19, 2015; U.S. Provisional Application Ser. No. 62/265,267, titled "Systems and Methods for Improving Coverage and Throughput of Mobile Access Points in a Network of Moving Things," filed on Dec. 9, 2015; U.S. Provisional Application Ser. No. 62/270,858, titled "Channel Coordination in a Network of Moving Things," filed on Dec. 22, 2015; U.S. Provisional Application Ser. No. 62/257,854, titled "Systems and Methods for Network Coded Mesh Networking in a Network of Moving Things," filed on Nov. 20, 2015; U.S. Provisional Application Ser. No. 62/260,749, titled "Systems and Methods for Improving Fixed Access Point Coverage in a Network of Moving Things," filed on Nov. 30, 2015; U.S. Provisional Application Ser. No. 62/273,715, titled "Systems and Methods for Managing Mobility Controllers and Their Network Interactions in a Network of Moving Things," filed on Dec. 31, 2015; U.S. Provisional Application Ser. No. 62/281,432, titled "Systems and Methods for Managing and Triggering Handovers of Mobile Access Points in a Network of Moving Things," filed on Jan. 21, 2016; U.S. Provisional Application Ser. No. 62/268,188, titled "Captive Portal-related Control and Management in a Network of Moving Things," filed on Dec. 16, 2015; U.S. Provisional Application Ser. No. 62/270,678, titled "Systems and Methods to Extrapolate High-Value Data from a Network of Moving Things," filed on Dec. 22, 2015; U.S. Provisional Application Ser. No. 62/272,750, titled "Systems and Methods for Remote Software Update and Distribution in a Network of Moving Things," filed on Dec. 30, 2015; U.S. Provisional Application Ser. No. 62/278,662, titled "Systems and Methods for Remote Configuration Update and Distribution in a Network of Moving Things," filed on Jan. 14, 2016; U.S. Provisional Application Ser. No. 62/286,243, titled "Systems and Methods for Adapting a Network of Moving Things Based on User Feedback," filed on Jan. 22, 2016; U.S. Provisional Application Ser. No. 62/278,764, titled "Systems and Methods to Guarantee Data Integrity When Building Data Analytics in a Network of Moving Things," Jan. 14, 2016; U.S. Provisional Application Ser. No. 62/286,515, titled "Systems and Methods for Self-Initialization and Automated Bootstrapping of Mobile Access Points in a Network of Moving Things," filed on Jan. 25, 2016; U.S. Provisional Application Ser. No. 62/295,602, titled "Systems and Methods for Power Management in a Network of Moving Things," filed on Feb. 16, 2016; and U.S. Provisional Application Ser. No. 62/299,269, titled "Systems and Methods for Automating and Easing the Installation and Setup of the Infrastructure Supporting a Network of Moving Things," filed on Feb. 24, 2016; each of which is hereby incorporated herein by reference in its entirety for all purposes.

BACKGROUND

Current communication networks are unable to adequately support communication environments involving moving networks. As a non-limiting example, current communication networks are unable to adequately support a network comprising a complex array of both moving and static nodes, some of which may be network access points (e.g., the Internet of moving things) interacting with sensor systems. Limitations and disadvantages of conventional methods and systems will become apparent to one of skill in the art, through comparison of such approaches with some aspects of the present methods and systems set forth in the remainder of this disclosure with reference to the drawings.

SUMMARY

Figure 1:
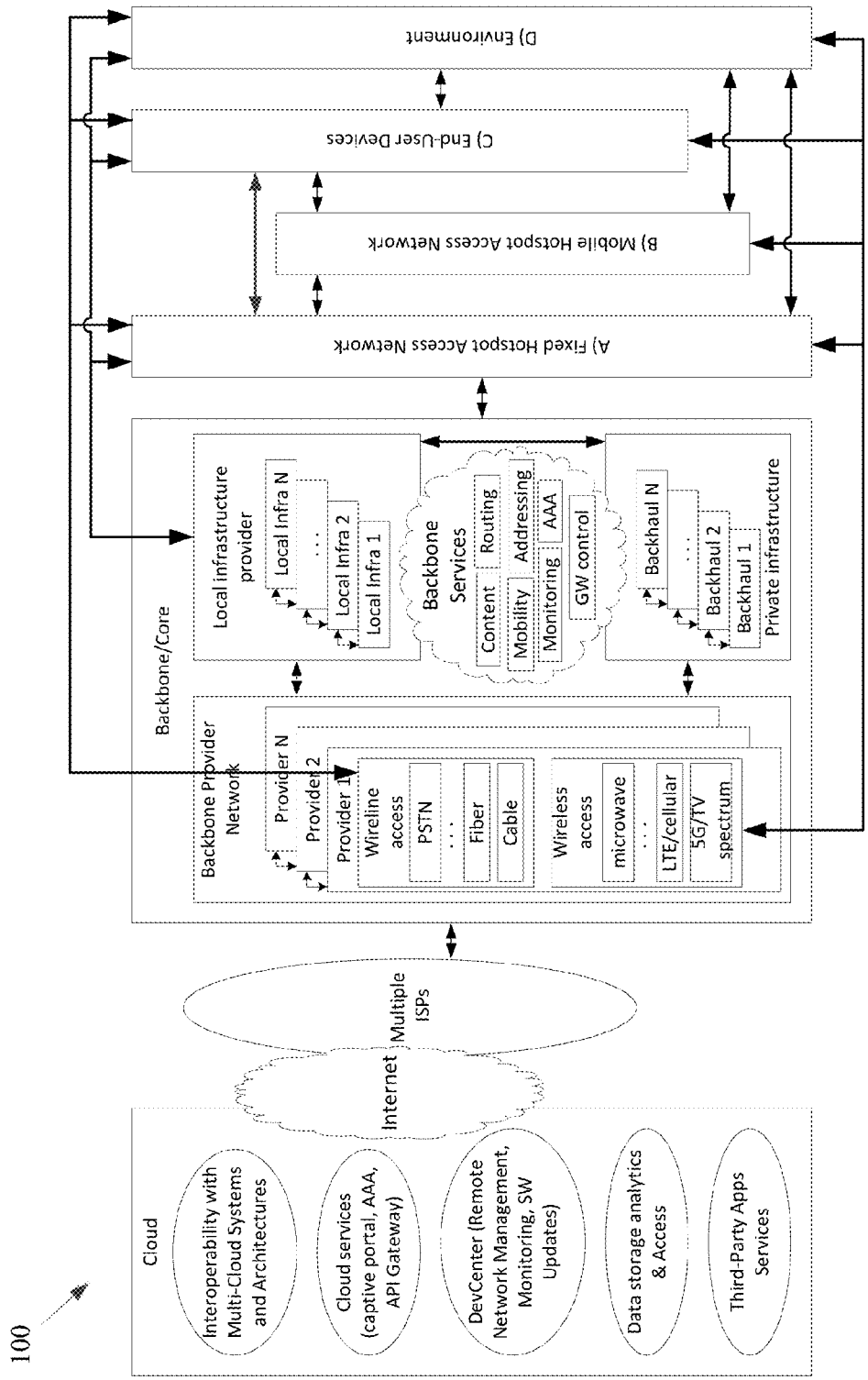
FIG. 1 shows a block diagram of a communication network, in accordance with various aspects of this disclosure.

Various aspects of this disclosure provide systems and methods for optimizing data gathering in a network of moving things. As non-limiting examples, various aspects of this disclosure provide systems and methods for operating sensor systems and collecting data from sensor systems in a network resource-efficient manner.

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (i.e., hardware) and any software and/or firmware ("code") that may configure the hardware, be executed by the hardware, and or otherwise be associated with the hardware.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set $\{(x), (y), (x, y)\}$. That is, "x and/or y" means "one or both of x and y." As another example, "x, y, and/or z" means any element of the seven-element set $\{(x), (y), (z), (x, y), (x, z), (y, z), (x, y, z)\}$. That is, "x, y, and/or x" means "one or more of x, y, and z." As utilized herein, the terms "e.g.," and "for example," "exemplary," and the like set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example an electronic device may be turned sideways so that its "top" surface is facing horizontally and its "side" surface is facing vertically, without departing from the teachings of the present disclosure.

With the proliferation of the mobile and/or static things (e.g., devices, machines, people, etc.) and logistics for such things to become connected to each other (e.g., in the contexts of smart logistics, transportation, environmental sensing, etc.), a platform that is for example always-on, robust, scalable and secure that is capable of providing connectivity, services and Internet access to such things (or objects), anywhere and anytime is desirable. Efficient power utilization within the various components of such system is also desirable.

Accordingly, various aspects of the present disclosure provide a fully-operable, always-on, responsive, robust, scalable, secure platform/system/architecture to provide connectivity, services and Internet access to all mobile things and/or static things (e.g., devices, machines, people, access points, end user devices, sensors, etc.) anywhere and anytime, while operating in an energy-efficient manner.

Various aspects of the present disclosure provide a platform that is flexibly configurable and adaptable to the various requirements, features, and needs of different environments, where each environment may be characterized by a respective level of mobility and density of mobile and/or static things, and the number and/or types of access to those things. Characteristics of various environments may, for example, include high mobility of nodes (e.g., causing contacts or connections to be volatile), high number of neighbors, high number of connected mobile users, mobile access points, availability of multiple networks and technologies (e.g., sometimes within a same area), etc. For example, the mode of operation of the platform may be flexibly adapted from environment to environment, based on each environment's respective requirements and needs, which may be different from other environments. Additionally for example, the platform may be flexibly optimized (e.g., at design/installation time and/or in real-time) for different purposes (e.g., to reduce the latency, increase throughput, reduce power consumption, load balance, increase reliability, make more robust with regard to failures or other disturbances, etc.), for example based on the content, service or data that the platform provides or handles within a particular environment.

In accordance with various aspects of the present disclosure, many control and management services (e.g., mobility, security, routing, etc.) are provided on top of the platform (e.g., directly, using control overlays, using containers, etc.), such services being compatible with the services currently deployed on top of the Internet or other communication network(s).

The communication network (or platform), in whole or in part, may for example be operated in public and/or private modes of operation, for example depending on the use case. The platform may, for example, operate in a public or private mode of operation, depending on the use-case (e.g., public Internet access, municipal environment sensing, fleet operation, etc.).

Additionally for example, in an implementation in which various network components are mobile, the transportation and/or signal control mechanisms may be adapted to serve the needs of the particular implementation. Also for example, wireless transmission power and/or rate may be adapted (e.g., to mitigate interference, to reduce power consumption, to extend the life of network components, etc.

Various example implementations of a platform, in accordance with various aspects of the present disclosure, are capable of connecting different subsystems, even when various other subsystems that may normally be utilized are unavailable. For example, the platform may comprise various built-in redundancies and fail-recovery mechanisms. For example, the platform may comprise a self-healing capability, self-configuration capability, self-adaptation capability, etc. The protocols and functions of the platform may, for example, be prepared to be autonomously and smoothly configured and adapted to the requirements and features of different environments characterized by different levels of mobility and density of things (or objects), the number/types of access to those things. For example, various aspects of the platform may gather context parameters that can influence any or all decisions. Such parameters may, for example, be derived locally, gathered from a neighborhood, Fixed APs, the Cloud, etc. Various aspects of the platform may also, for example, ask for historical information to feed any of the decisions, where such information can be derived from historical data, from surveys, from simulators, etc. Various aspects of the platform may additionally, for example, probe or monitor decisions made throughout the network, for example to evaluate the network and/or the decisions themselves in real-time. Various aspects of the platform may further, for example, enforce the decisions in the network (e.g., after evaluating the probing results). Various aspects of the platform may, for example, establish thresholds to avoid any decision that is to be constantly or repeatedly performed without any significant advantage (e.g., technology change, certificate change, IP change, etc.). Various aspects of the platform may also, for example, learn locally (e.g., with the decisions performed) and dynamically update the decisions.

In addition to (or instead of) failure robustness, a platform may utilize multiple connections (or pathways) that exist between distinct sub-systems or elements within the same sub-system, to increase the robustness and/or load-balancing of the system.

The following discussion will present examples of the functionality performed by various example subsystems of the communication network. It should be understood that the example functionality discussed herein need not be performed by the particular example subsystem or by a single subsystem. For example, the subsystems present herein may interact with each other, and data or control services may be deployed either in a centralized way, or having their functionalities distributed among the different subsystems, for example leveraging the cooperation between the elements of each subsystem.

Various aspects of the present disclosure provide a communication network (e.g., a city-wide vehicular network, a shipping port-sized vehicular network, a campus-wide vehicular network, etc.) that utilizes vehicles (e.g., automobiles, buses, trucks, boats, forklifts, human-operated vehicles, autonomous and/or remote controlled vehicles, etc.) as Wi-Fi hotspots. Note that Wi-Fi is generally used throughout this discussion as an example, but the scope of various aspects of this disclosure is not limited thereto. For example, other wireless LAN technologies, PAN technologies, MAN technologies, etc., may be utilized. Such utilization may, for example, provide cost-effective ways to gather substantial amounts of urban data, and provide for the efficient offloading of traffic from congested cellular networks (or other networks). In controlled areas (e.g., ports, harbors, etc.) with many vehicles, a communication network in accordance with various aspects of this disclosure may expand the wireless coverage of existing enterprise Wi-Fi networks, for example providing for real-time communication with vehicle drivers (e.g., human, computer-controlled, etc.) and other mobile employees without the need for SIM cards or cellular (or other network) data plans.

Vehicles may have many advantageous characteristics that make them useful as Wi-Fi (or general wireless) hotspots. For example, vehicles generally have at least one battery, vehicles are generally densely spread over the city at street level and/or they are able to establish many contacts with each other in a controlled space, and vehicles can communicate with 10x the range of normal Wi-Fi in the 5.9 GHz frequency band, reserved for intelligent transportation systems in the EU, the U.S., and elsewhere. Note that the scope of this disclosure is not limited to such 5.9 GHz wireless communication. Further, vehicles are able to effectively expand their coverage area into a swath over a period of time, enabling a single vehicle access point to interact with substantially more data sources over the period of time.

In accordance with various aspects of the present disclosure, an affordable multi-network on-board unit (OBU) is presented. Note that the OBU may also be referred to herein as a mobile access point, Mobile AP, MAP, etc. The OBU may, for example, comprise a plurality of networking interfaces (e.g., Wi-Fi, 802.11p, 4G, Bluetooth, UWB, etc.). The OBU may, for example, be readily installed in or on private and/or public vehicles (e.g., individual user vehicles, vehicles of private fleets, vehicles of public fleets, etc.). The OBU may, for example, be installed in transportation fleets, waste management fleets, law enforcement fleets, emergency services, road maintenance fleets, taxi fleets, aircraft fleets, etc. The OBU may, for example, be installed in or on a vehicle or other structure with free mobility or relatively limited mobility. The OBU may also, for example, be carried by a person or service animal, mounted to a bicycle, mounted to a moving machine in general, mounted to a container, etc.

The OBUs may, for example, operate to connect passing vehicles to the wired infrastructure of one or more network providers, telecom operators, etc. In accordance with the architecture, hardware, and software functionality discussed herein, vehicles and fleets can be connected not just to the cellular networks (or other wide area or metropolitan area networks, etc.) and existing Wi-Fi hotspots spread over a city or a controlled space, but also to other vehicles (e.g., utilizing multi-hop communications to a wired infrastructure, single or multi-hop peer-to-peer vehicle communication, etc.). The vehicles and/or fleets may, for example, form an overall mesh of communication links, for example including the OBUs and also fixed Access Points (APs) connected to the wired infrastructure (e.g., a local infrastructure, etc.). Note that OBUs herein may also be referred to as "Mobile APs," "mobile hotspots," "MAPs," etc. Also note that fixed access points may also be referred to herein as Road Side Units (RSUs), Fixed APs, FAPs, etc.

In an example implementation, the OBUs may communicate with the Fixed APs utilizing a relatively long-range protocol (e.g., 802.11p, etc.), and the Fixed APs may, in turn, be hard wired to the wired infrastructure (e.g., via cable, tethered optical link, etc.). Note that Fixed APs may also, or alternatively, be coupled to the infrastructure via wireless link (e.g., 802.11p, etc.). Additionally, clients or user devices may communicate with the OBUs using one or more relatively short-range protocols (e.g., Wi-Fi, Bluetooth, UWB, etc.). The OBUs, for example having a longer effective wireless communication range than typical Wi-Fi access points or other wireless LAN/PAN access points (e.g., at least for links such as those based on 802.11p, etc.), are capable of substantially greater coverage areas than typical Wi-Fi or other wireless LAN/PAN access points, and thus fewer OBUs are necessary to provide blanket coverage over a geographical area.

The OBU may, for example, comprise a robust vehicular networking module (e.g., a connection manager) which builds on long-range communication protocol capability (e.g., 802.11p, etc.). For example, in addition to comprising 802.11p (or other long-range protocol) capability to communicate with Fixed APs, vehicles, and other nodes in the network, the OBU may comprise a network interface (e.g., 802.11a/b/g/n, 802.11ac, 802.11af, any combination thereof, etc.) to provide wireless local area network (WLAN) connectivity to end user devices, sensors, fixed Wi-Fi access points, etc. For example, the OBU may operate to provide in-vehicle Wi-Fi Internet access to users in and/or around the vehicle (e.g., a bus, train car, taxi cab, public works vehicle, etc.). The OBU may further comprise one or more wireless backbone communication interfaces (e.g., cellular network interfaces, etc.). Though in various example scenarios, a cellular network interface (or other wireless backbone communication interface) might not be the preferred interface for various reasons (e.g., cost, power, bandwidth, etc.), the cellular network interface may be utilized to provide connectivity in geographical areas that are not presently supported by a Fixed AP, may be utilized to provide a fail-over communication link, may be utilized for emergency communications, may be utilized to subscribe to local infrastructure access, etc. The cellular network interface may also, for example, be utilized to allow the deployment of solutions that are dependent on the cellular network operators.

An OBU, in accordance with various aspects of the present disclosure, may for example comprise a smart connection manager that can select the best available wireless link(s) (e.g., Wi-Fi, 802.11p, cellular, vehicle mesh, etc.) with which to access the Internet. The OBU may also, for example, provide geo-location capabilities (e.g., GPS, etc.), motion detection sensors to determine if the vehicle is in motion, and a power control subsystem (e.g., to ensure that the OBU does not deplete the vehicle battery, etc.). The OBU may, for example, comprise any or all of the sensors (e.g., environmental sensors, etc.) discussed herein.

The OBU may also, for example, comprise a manager that manages machine-to-machine data acquisition and transfer (e.g., in a real-time or delay-tolerant fashion) to and from the Cloud. For example, the OBU may log and/or communicate information of the vehicles.

The OBU may, for example, comprise a connection and/or routing manager that operates to perform routing of communications in a vehicle-to-vehicle/vehicle-to-infrastructure multi-hop communication. A mobility manager (or controller, MC) may, for example, ensure that communication sessions persist over one or more handoff(s) (also referred to herein as a "handover" or "handovers") (e.g., between different Mobile APs, Fixed APs, base stations, hot spots, etc.), among different technologies (e.g., 802.11p, cellular, Wi-Fi, satellite, etc.), among different MCs (e.g., in a fail-over scenario, load redistribution scenario, etc.), across different interfaces (or ports), etc. Note that the MC may also be referred to herein as a Local Mobility Anchor (LMA), a Network Controller, etc. Note that the MC, or a plurality thereof, may for example be implemented as part of the backbone, but may also, or alternatively, be implemented as part of any of a variety of components or combinations thereof. For example, the MC may be implemented in a Fixed AP (or distributed system thereof), as part of an OBU (or a distributed system thereof), etc. Various non-limiting examples of system components and/or methods are provided in U.S. Provisional Application No. 62/222,098, filed Sep. 22, 2015, and titled "Systems and Method for Managing Mobility in a Network of Moving Things," the entire contents of which are hereby incorporated herein by reference. Note that in an example implementation including a plurality of MCs, such MCs may be co-located and/or may be geographically distributed.

Various aspects of the present disclosure also provide a Cloud-based service-oriented architecture that handles the real-time management, monitoring and reporting of the network and clients, the functionalities required for data storage, processing and management, the Wi-Fi client authentication and Captive Portal display, etc.

A communication network (or component thereof) in accordance with various aspects of the present disclosure may, for example, support a wide range of smart city applications (or controlled scenarios, or connected scenarios, etc.) and/or use-cases, as described herein.

For example, an example implementation may operate to turn each vehicle (e.g., both public and private taxis, buses, trucks, etc.) into a Mobile AP (e.g., a mobile Wi-Fi hotspot), offering Internet access to employees, passengers and mobile users travelling in the city, waiting in bus stops, sitting in parks, etc. Moreover, through an example vehicular mesh network formed between vehicles and/or fleets of vehicles, an implementation may be operable to offload cellular traffic through the mobile Wi-Fi hotspots and/or Fixed APs (e.g., 802.11p-based APs) spread over the city and connected to the wired infrastructure of public or private telecom operators in strategic places, while ensuring the widest possible coverage at the lowest possible cost.

An example implementation (e.g., of a communication network and/or components thereof) may, for example, be operable as a massive urban scanner that gathers large amounts of data (e.g., continuously) on-the-move, actionable or not, generated by a myriad of sources spanning from the in-vehicle sensors or On Board Diagnostic System port (e.g., OBD2, etc.), interface with an autonomous vehicle driving system, external Wi-Fi/Bluetooth-enabled sensing units spread over the city, devices of vehicles' drivers and passengers (e.g., information characterizing such devices and/or passengers, etc.), positioning system devices (e.g., position information, velocity information, trajectory information, travel history information, etc.), etc.

Depending on the use case, the OBU may for example process (or computer, transform, manipulate, aggregate, summarize, etc.) the data before sending the data from the vehicle, for example providing the appropriate granularity (e.g., value resolution) and sampling rates (e.g., temporal resolution) for each individual application. For example, the OBU may, for example, process the data in any manner deemed advantageous by the system. The OBU may, for example, send the collected data (e.g., raw data, preprocessed data, information of metrics calculated based on the collected data, etc.) to the Cloud (e.g., to one or more networked servers coupled to any portion of the network) in an efficient and reliable manner to improve the efficiency, environmental impact and social value of municipal city operations and transportation services. Various example use cases are described herein.

In an example scenario in which public buses are moving along city routes and/or taxis are performing their private transportation services, the OBU is able to collect large quantities of real-time data from the positioning systems (e.g., GPS, etc.), from accelerometer modules, etc. The OBU may then, for example, communicate such data to the Cloud, where the data may be processed, reported and viewed, for example to support such public or private bus and/or taxi operations, for example supporting efficient remote monitoring and scheduling of buses and taxis, respectively.

In an example implementation, small cameras (or other sensors) may be coupled to small single-board computers (SBCs) that are placed above the doors of public buses to allow capturing image sequences of people entering and leaving buses, and/or on stops along the bus routes in order to estimate the number of people waiting for a bus. Such data may be gathered by the OBU in order to be sent to the Cloud. With such data, public transportation systems may detect peaks; overcrowded buses, routes and stops; underutilized buses, routes and stops; etc., enabling action to be taken in real-time (e.g., reducing bus periodicity to decrease fuel costs and $CO_2$ emissions where and when passenger flows are smaller, etc.) as well as detecting systematic transportation problems.

An OBU may, for example, be operable to communicate with any of a variety of Wi-Fi-enabled sensor devices equipped with a heterogeneous collection of environmental sensors. Such sensors may, for example, comprise noise sensors (microphones, etc.), gas sensors (e.g., sensing CO, $NO_2$, $O_3$, volatile organic compounds (or VOCs), $CO_2$, etc.), smoke sensors, pollution sensors, meteorological sensors (e.g., sensing temperature, humidity, luminosity, particles, solar radiation, wind speed (e.g., anemometer), wind direction, rain (e.g., a pluviometer), optical scanners, biometric scanners, cameras, microphones, etc.). Such sensors may also comprise sensors associated with users (e.g., vehicle operators or passengers, passersby, etc.) and/or their personal devices (e.g., smart phones or watches, biometrics sensors, wearable sensors, implanted sensors, etc.). Such sensors may, for example, comprise sensors and/or systems associated with on-board diagnostic (OBD) units for vehicles, autonomous vehicle driving systems, etc. Such sensors may, for example, comprise positioning sensors (e.g., GPS sensors, Galileo sensors, GLONASS sensors, etc.). Note that such positioning sensors may be part of a vehicle's operational system (e.g., a local human-controlled vehicle, an autonomous vehicle, a remote human-controlled vehicle, etc.) Such sensors may, for example, comprise container sensors (e.g., garbage can sensors, shipping container sensors, container environmental sensors, container tracking sensors, etc.).

Once a vehicle enters the vicinity of such a sensor device, a wireless link may be established, so that the vehicle (or OBU thereof) can collect sensor data from the sensor device and upload the collected data to a database in the Cloud. The appropriate action can then be taken. In an example waste management implementation, several waste management (or collection) trucks may be equipped with OBUs that are able to periodically communicate with sensors installed on containers in order to gather information about waste level, time passed since last collection, etc. Such information may then sent to the Cloud (e.g., to a waste management application coupled to the Internet, etc.) through the vehicular mesh network, in order to improve the scheduling and/or routing of waste management trucks. Note that various sensors may always be in range of the Mobile AP (e.g., vehicle-mounted sensors). Note that the sensor may also (or alternatively) be mobile (e.g., a sensor mounted to another vehicle passing by a Mobile AP or Fixed AP, a drone-mounted sensor, a pedestrian-mounted sensor, etc.).

In an example implementation, for example in a controlled space (e.g., a port, harbor, airport, factory, plantation, mine, etc.) with many vehicles, machines and employees, a communication network in accordance with various aspects of the present disclosure may expand the wireless coverage of enterprise and/or local Wi-Fi networks, for example without resorting to a Telco-dependent solution based on SIM cards or cellular fees. In such an example scenario, apart from avoiding expensive cellular data plans, limited data rate and poor cellular coverage in some places, a communication network in accordance with various aspects of the present disclosure is also able to collect and/or communicate large amounts of data, in a reliable and real-time manner, where such data may be used to optimize harbor logistics, transportation operations, etc.

For example in a port and/or harbor implementation, by gathering real-time information on the position, speed, fuel consumption and $CO_2$ emissions of the vehicles, the communication network allows a port operator to improve the coordination of the ship loading processes and increase the throughput of the harbor. Also for example, the communication network enables remote monitoring of drivers' behaviors, behaviors of autonomous vehicles and/or control systems thereof, trucks' positions and engines' status, and then be able to provide real-time notifications to drivers (e.g., to turn on/off the engine, follow the right route inside the harbor, take a break, etc.), for example human drivers and/or automated vehicle driving systems, thus reducing the number and duration of the harbor services and trips. Harbor authorities may, for example, quickly detect malfunctioning trucks and abnormal trucks' circulation, thus avoiding accidents in order to increase harbor efficiency, security, and safety. Additionally, the vehicles can also connect to Wi-Fi access points from harbor local operators, and provide Wi-Fi Internet access to vehicles' occupants and surrounding harbor employees, for example allowing pilots to save time by filing reports via the Internet while still on the water.

FIG. 1 shows a block diagram of a communication network 100, in accordance with various aspects of this disclosure. Any or all of the functionality discussed herein may be performed by any or all of the example components of the example network 100. Also, the example network 100 may, for example, share any or all characteristics with the other example networks and/or network components 200, 300, 400, 500-570, 600, 700, 800, 900, 1000, 1100, and 1200, discussed herein.

The example network 100, for example, comprises a Cloud that may, for example comprise any of a variety of network level components. The Cloud may, for example, comprise any of a variety of server systems executing applications that monitor and/or control components of the network 100. Such applications may also, for example, manage the collection of information from any of a large array of networked information sources, many examples of which are discussed herein. The Cloud (or a portion thereof) may also be referred to, at times, as an API. For example, Cloud (or a portion thereof) may provide one or more application programming interfaces (APIs) which other devices may use for communicating/interacting with the Cloud.

An example component of the Cloud may, for example, manage interoperability with various multi-Cloud systems and architectures. Another example component (e.g., a Cloud service component) may, for example, provide various Cloud services (e.g., captive portal services, authentication, authorization, and accounting (AAA) services, API Gateway services, etc.). An additional example component (e.g., a DevCenter component) may, for example, provide network monitoring and/or management functionality, manage the implementation of software updates, etc. A further example component of the Cloud may manage data storage, data analytics, data access, etc. A still further example component of the Cloud may include any of a variety of third-partly applications and services.

The Cloud may, for example, be coupled to the Backbone/Core Infrastructure of the example network 100 via the Internet (e.g., utilizing one or more Internet Service Providers). Though the Internet is provided by example, it should be understood that scope of the present disclosure is not limited thereto.

The Backbone/Core may, for example, comprise any one or more different communication infrastructure components. For example, one or more providers may provide backbone networks or various components thereof. As shown in the example network 100 illustrated in FIG. 1, a Backbone provider may provide wireline access (e.g., PSTN, fiber, cable, etc.). Also for example, a Backbone provider may provide wireless access (e.g., Microwave, LTE/Cellular, 5G/TV Spectrum, etc.).

The Backbone/Core may also, for example, comprise one or more Local Infrastructure Providers. The Backbone/Core may also, for example, comprise a private infrastructure (e.g., run by the network 100 implementer, owner, etc.). The Backbone/Core may, for example, provide any of a variety of Backbone Services (e.g., AAA, Mobility, Monitoring, Addressing, Routing, Content services, Gateway Control services, etc.).

The Backbone/Core Infrastructure may comprise any of a variety of characteristics, non-limiting examples of which are provided herein. For example, the Backbone/Core may be compatible with different wireless or wired technologies for backbone access. The Backbone/Core may also be adaptable to handle public (e.g., municipal, city, campus, etc.) and/or private (e.g., ports, campus, etc.) network infrastructures owned by different local providers, and/or owned by the network implementer or stakeholder. The Backbone/Core may, for example, comprise and/or interface with different Authentication, Authorization, and Accounting (AAA) mechanisms.

The Backbone/Core Infrastructure may, for example, support different modes of operation (e.g., L2 in port implementations, L3 in on-land public transportation implementations, utilizing any one or more of a plurality of different layers of digital IP networking, any combinations thereof, equivalents thereof, etc.) or addressing pools. The Backbone/Core may also for example, be agnostic to the Cloud provider(s) and/or Internet Service Provider(s). Additionally for example, the Backbone/Core may be agnostic to requests coming from any or all subsystems of the network 100 (e.g., Mobile APs or OBUs (On Board Units), Fixed APs or RSUs (Road Side Units), MCs (Mobility Controllers) or LMAs (Local Mobility Anchors) or Network Controllers, etc.) and/or third-party systems.

The Backbone/Core Infrastructure may, for example, comprise the ability to utilize and/or interface with different data storage/processing systems (e.g., MongoDB, MySql, Redis, etc.). The Backbone/Core Infrastructure may further, for example, provide different levels of simultaneous access to the infrastructure, services, data, etc.

Figure 2:
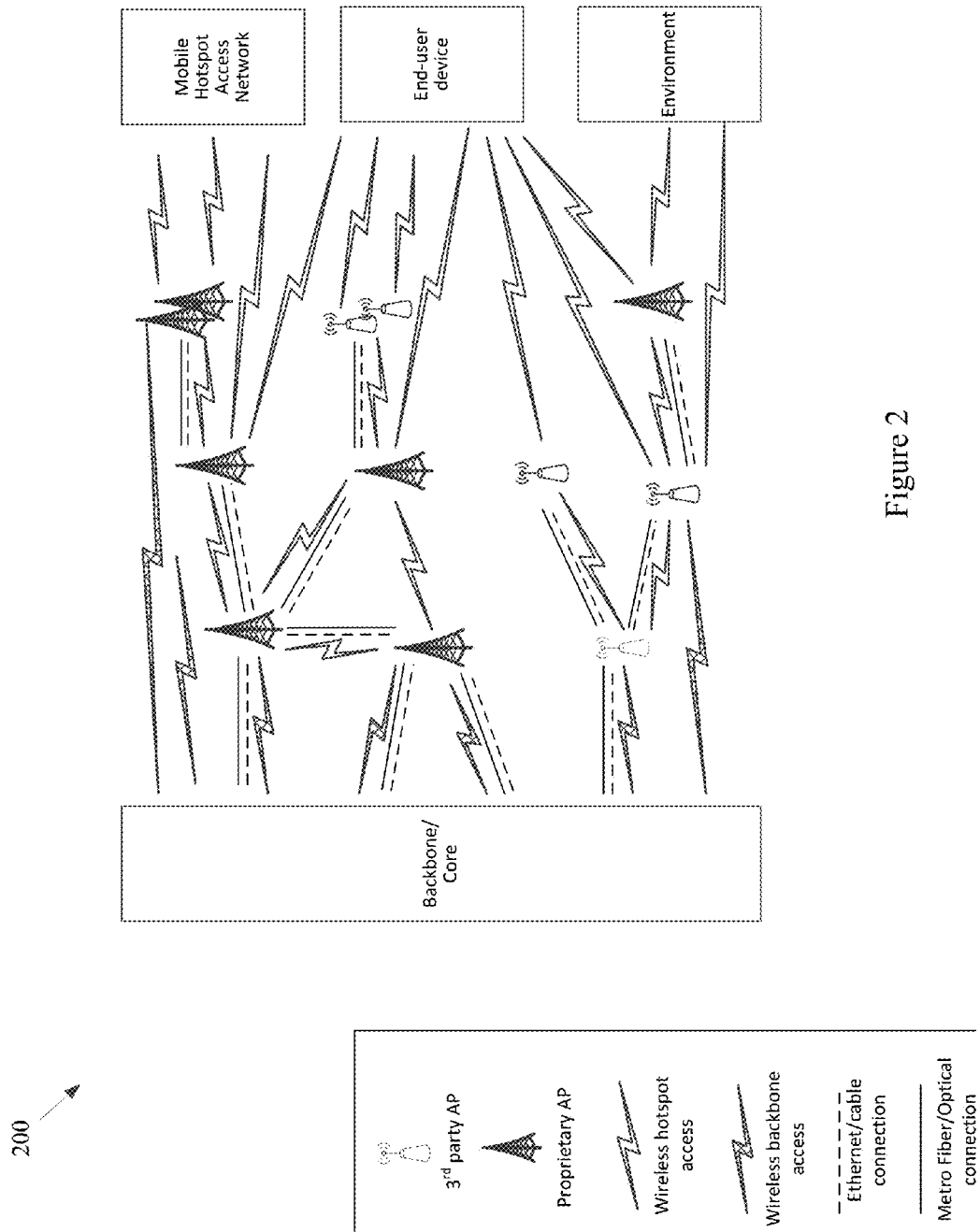
FIG. 2 shows a block diagram of a communication network, in accordance with various aspects of this disclosure.

The example network 100 may also, for example, comprise a Fixed Hotspot Access Network. Various example characteristics of such a Fixed Hotspot Access Network 200 are shown at FIG. 2. The example network 200 may, for example, share any or all characteristics with the other example networks and/or network components 100, 300, 400, 500-570, 600, 700, 800, 900, 1000, 1100, and 1200 discussed herein.

In the example network 200, the Fixed APs (e.g., the proprietary APs, the public third party APs, the private third party APs, etc.) may be directly connected to the local infrastructure provider and/or to the wireline/wireless backbone. Also for example, the example network 200 may comprise a mesh between the various APs via wireless technologies. Note, however, that various wired technologies may also be utilized depending on the implementation. As shown, different fixed hotspot access networks can be connected to a same backbone provider, but may also be connected to different respective backbone providers. In an example implementation utilizing wireless technology for backbone access, such an implementation may be relatively fault tolerant. For example, a Fixed AP may utilize wireless communications to the backbone network (e.g., cellular, 3G, LTE, other wide or metropolitan area networks, etc.) if the backhaul infrastructure is down. Also for example, such an implementation may provide for relatively easy installation (e.g., a Fixed AP with no cable power source that can be placed virtually anywhere).

In the example network 200, the same Fixed AP can simultaneously provide access to multiple Fixed APs, Mobile APs (e.g., vehicle OBUs, etc.), devices, user devices, sensors, things, etc. For example, a plurality of mobile hotspot access networks (e.g., OBU-based networks, etc.) may utilize the same Fixed AP. Also for example, the same Fixed AP can provide a plurality of simultaneous accesses to another single unit (e.g., another Fixed AP, Mobile AP, device, etc.), for example utilizing different channels, different radios, etc.).

Note that a plurality of Fixed APs may be utilized for fault-tolerance/fail-recovery purposes. In an example implementation, a Fixed AP and its fail-over AP may both be normally operational (e.g., in a same switch). Also for example, one or more Fixed APs may be placed in the network at various locations in an inactive or monitoring mode, and ready to become operational when needed (e.g., in response to a fault, in response to an emergency services need, in response to a data surge, etc.).

Referring back to FIG. 1, the example Fixed Hotspot Access Network is shown with a wireless communication link to a backbone provider (e.g., to one or more Backbone Providers and/or Local Infrastructure Providers), to a Mobile Hotspot Access Network, to one or more End User Devices, and to the Environment. Also, the example Fixed Hotspot Access Network is shown with a wired communication link to one or more Backbone Providers, to the Mobile Hotspot Access Network, to one or more End User Devices, and to the Environment. The Environment may comprise any of a variety of devices (e.g., in-vehicle networks, devices, and sensors; autonomous vehicle networks, devices, and sensors; maritime (or watercraft) and port networks, devices, and sensors; general controlled-space networks, devices, and sensors; residential networks, devices, and sensors; disaster recovery & emergency networks, devices, and sensors; military and aircraft networks, devices, and sensors; smart city networks, devices, and sensors; event (or venue) networks, devices, and sensors; underwater and underground networks, devices, and sensors; agricultural networks, devices, and sensors; tunnel (auto, subway, train, etc.) networks, devices, and sensors; parking networks, devices, and sensors; security and surveillance networks, devices, and sensors; shipping equipment and container networks, devices, and sensors; environmental control or monitoring networks, devices, and sensors; municipal networks, devices, and sensors; waste management networks, devices, and sensors, road maintenance networks, devices, and sensors, traffic management networks, devices, and sensors; advertising networks, devices and sensors; etc.).

Figure 3:
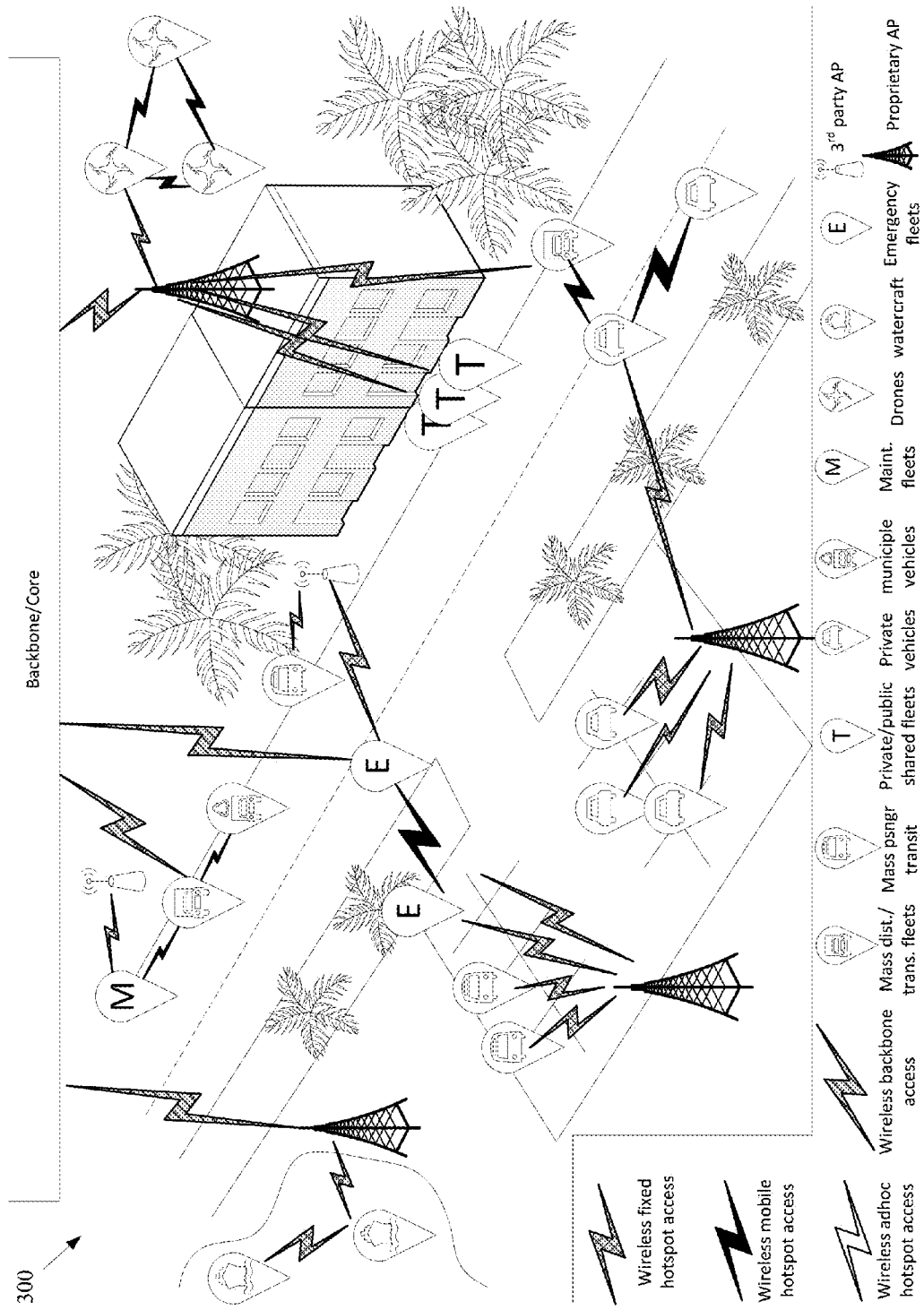
FIG. 3 shows a diagram of a metropolitan area network, in accordance with various aspects of this disclosure.

The example network 100 of FIG. 1 also comprises a Mobile Hotspot Access Network. Various example characteristics of such a Mobile Hotspot Access Network 300 are shown at FIG. 3. Note that various fixed network components (e.g., Fixed APs) are also illustrated. The example network 300 may, for example, share any or all characteristics with the other example networks and/or network components 100, 200, 400, 500-570, 600, 700, 800, 900, 1000, 1100, and 1200 discussed herein.

The example network 300 comprises a wide variety of Mobile APs (or hotspots) that provide access to user devices, provide for sensor data collection, provide multi-hop connectivity to other Mobile APs, etc. For example, the example network 300 comprises vehicles from different fleets (e.g., aerial, terrestrial, underground, (under)water, etc.). For example, the example network 300 comprises one or more mass distribution/transportation fleets, one or more mass passenger transportation fleets, private/public shared-user fleets, private vehicles, urban and municipal fleets, maintenance fleets, drones, watercraft (e.g., boats, ships, speedboats, tugboats, barges, etc.), emergency fleets (e.g., police, ambulance, firefighter, etc.), etc.

The example network 300, for example, shows vehicles from different fleets directly connected and/or mesh connected, for example using same or different communication technologies. The example network 300 also shows fleets simultaneously connected to different Fixed APs, which may or may not belong to different respective local infrastructure providers. As a fault-tolerance mechanism, the example network 300 may for example comprise the utilization of long-range wireless communication network (e.g., cellular, 3G, 4G, LTE, etc.) in vehicles if the local network infrastructure is down or otherwise unavailable. A same vehicle (e.g., Mobile AP or OBU) can simultaneously provide access to multiple vehicles, devices, things, etc., for example using a same communication technology (e.g., shared channels and/or different respective channels thereof) and/or using a different respective communication technology for each. Also for example, a same vehicle can provide multiple accesses to another vehicle, device, thing, etc., for example using a same communication technology (e.g., shared channels and/or different respective channels thereof, and/or using a different communication technology).

Additionally, multiple network elements may be connected together to provide for fault-tolerance or fail recovery, increased throughput, or to achieve any or a variety of a client's networking needs, many of examples of which are provided herein. For example, two Mobile APs (or OBUs) may be installed in a same vehicle, etc.

Referring back to FIG. 1, the example Mobile Hotspot Access Network is shown with a wireless communication link to a backbone provider (e.g., to one or more Backbone Providers and/or Local Infrastructure Providers), to a Fixed Hotspot Access Network, to one or more End User Device, and to the Environment (e.g., to any one of more of the sensors or systems discussed herein, any other device or machine, etc.). Though the Mobile Hotspot Access Network is not shown having a wired link to the various other components, there may (at least at times) be such a wired link, at least temporarily.

Figure 4:
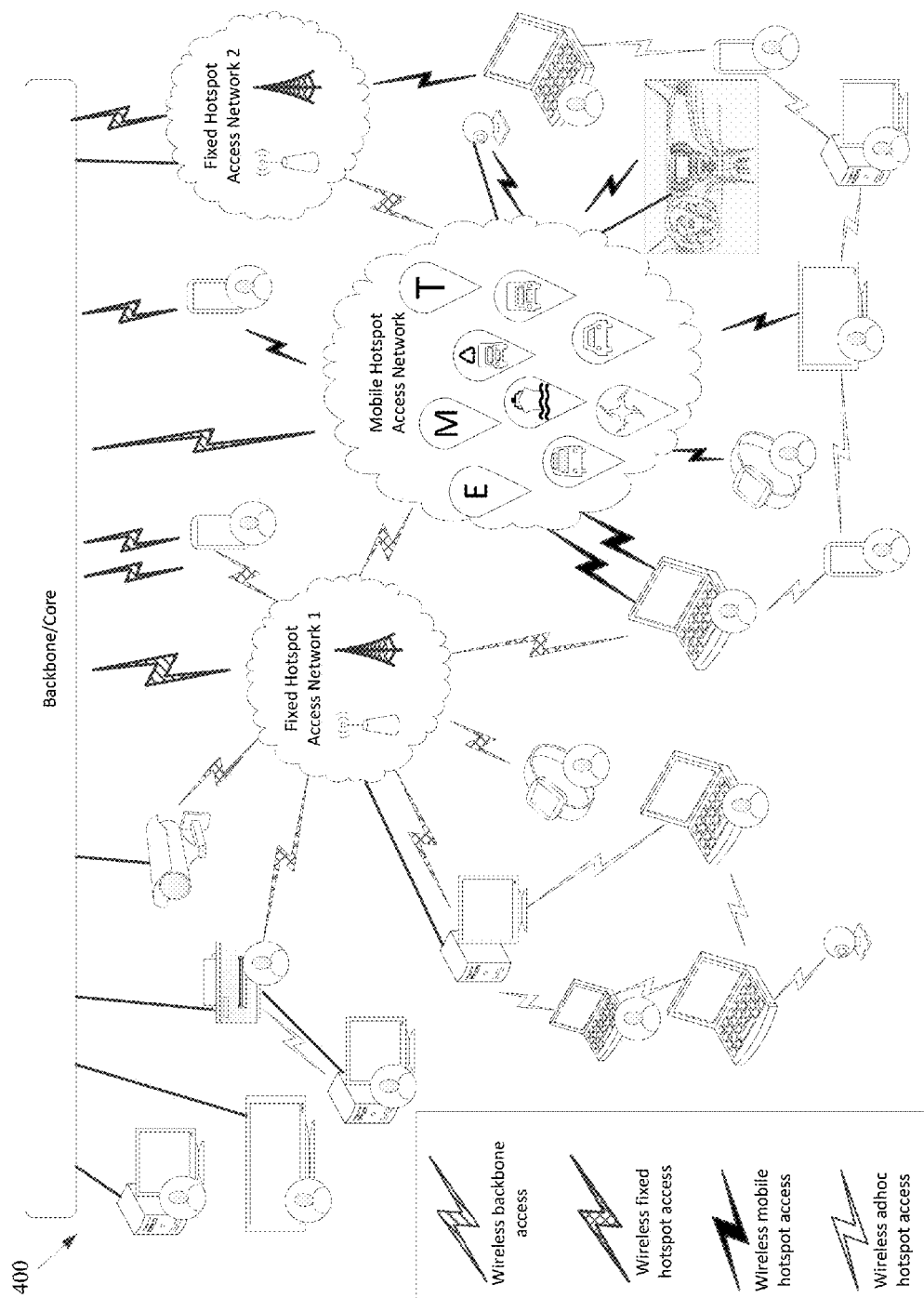
FIG. 4 shows a block diagram of a communication network, in accordance with various aspects of this disclosure.

The example network 100 of FIG. 1 also comprises a set of End-User Devices. Various example end user devices are shown at FIG. 4. Note that various other network components (e.g., Fixed Hotspot Access Networks, Mobile Hotspot Access Network(s), the Backbone/Core, etc.) are also illustrated. The example network 400 may, for example, share any or all characteristics with the other example networks and/or network components 100, 200, 300, 500-570, 600, 700, 800, 900, 1000, 1100, and 1200 discussed herein.

The example network 400 shows various mobile networked devices. Such network devices may comprise end-user devices (e.g., smartphones, tablets, smartwatches, laptop computers, webcams, personal gaming devices, personal navigation devices, personal media devices, personal cameras, health-monitoring devices, personal location devices, monitoring panels, printers, etc.). Such networked devices may also comprise any of a variety of devices operating in the general environment, where such devices might not for example be associated with a particular user (e.g. any or all of the sensor devices discussed herein, vehicle sensors, municipal sensors, fleet sensors road sensors, environmental sensors, security sensors, traffic sensors, waste sensors, meteorological sensors, any of a variety of different types of municipal or enterprise equipment, etc.). Any of such networked devices can be flexibly connected to distinct backbone, fixed hotspot access networks, mobile hotspot access networks, etc., using the same or different wired/wireless technologies.

A mobile device may, for example, operate as an AP to provide simultaneous access to multiple devices/things, which may then form ad hoc networks, interconnecting devices ultimately connected to distinct backbone networks, fixed hotspot, and/or mobile hotspot access networks. Devices (e.g., any or all of the devices or network nodes discussed herein) may, for example, have redundant technologies to access distinct backbone, fixed hotspot, and/or mobile hotspot access networks, for example for fault-tolerance and/or load-balancing purposes (e.g., utilizing multiple SIM cards, etc.). A device may also, for example, simultaneously access distinct backbone, fixed hotspot access networks, and/or mobile hotspot access networks, belonging to the same provider or to different respective providers. Additionally for example, a device can provide multiple accesses to another device/thing (e.g., via different channels, radios, etc.).

Referring back to FIG. 1, the example End-User Devices are shown with a wireless communication link to a backbone provider (e.g., to one or more Backbone Providers and/or Local Infrastructure Providers), to a Fixed Hotspot Access Network, to a Mobile Hotspot Access Network, and to the Environment. Also for example, the example End-User Devices are shown with a wired communication link to a backbone provider, to a Fixed Hotspot Access Network, to a Mobile Hotspot Access Network, and to the Environment.

Figure 5A:
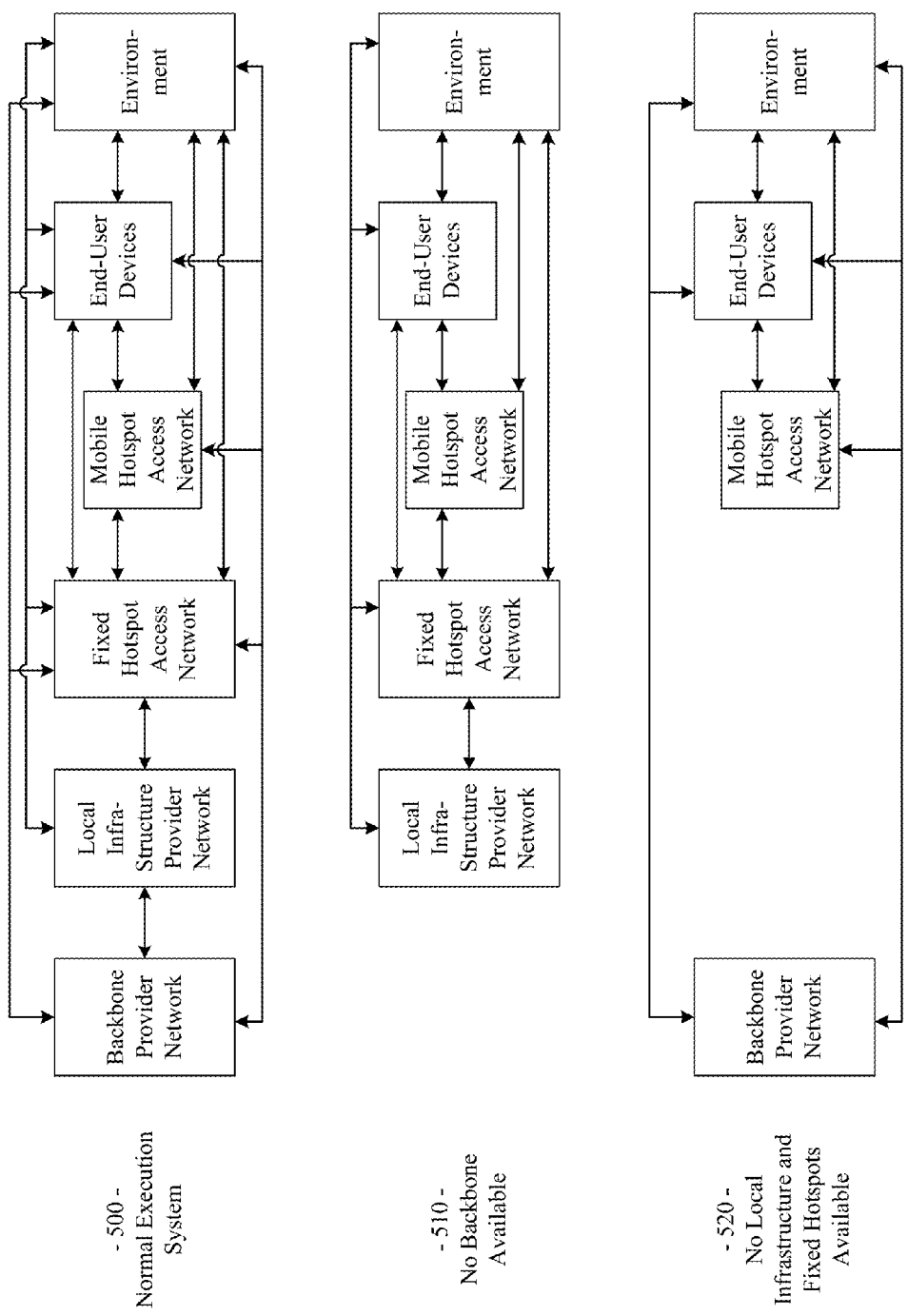
FIGS. 5A-5C show a plurality of network configurations illustrating the flexibility and/or and resiliency of a communication network, in accordance with various aspects of this disclosure.
Figure 5B:
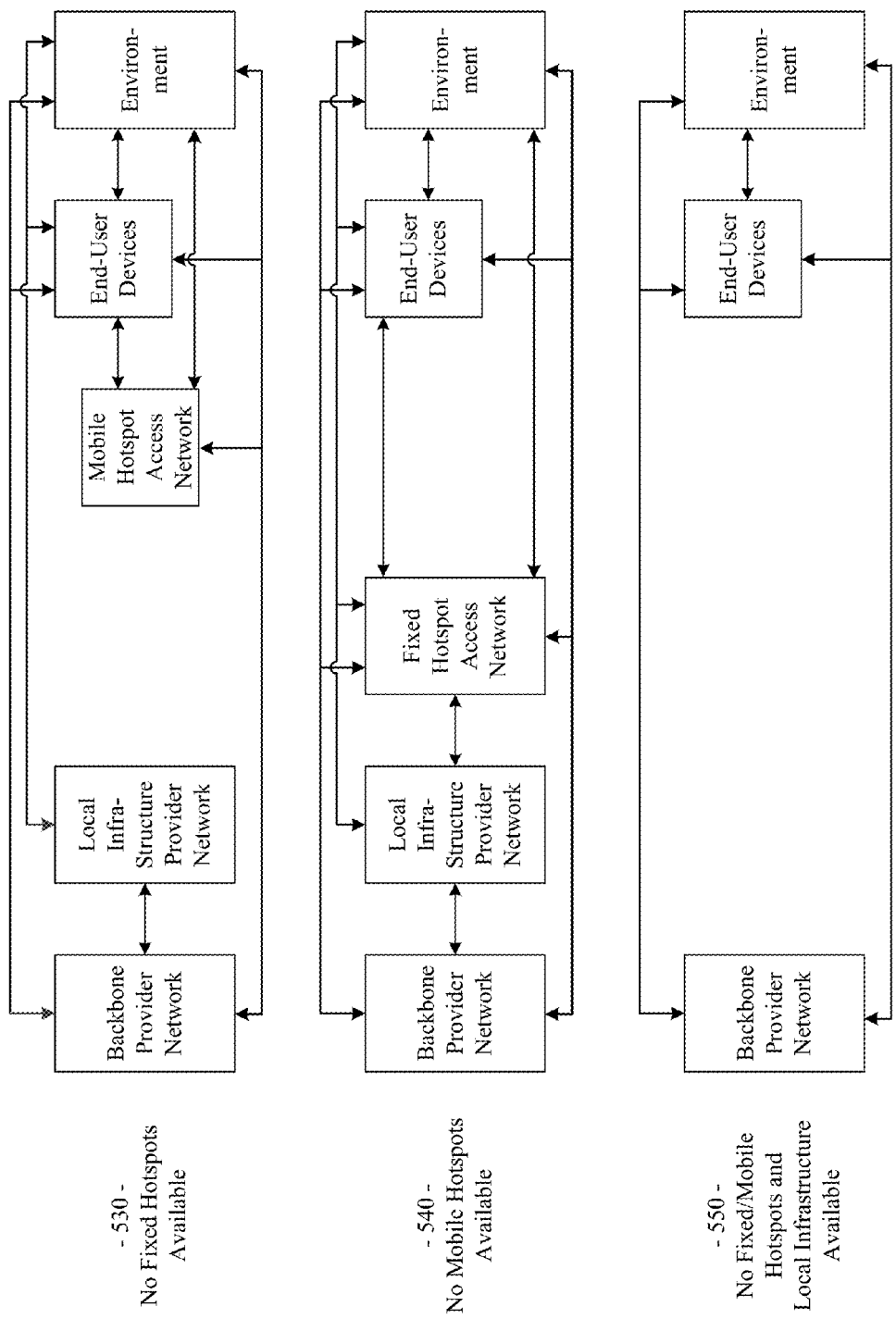
Figure 5C:
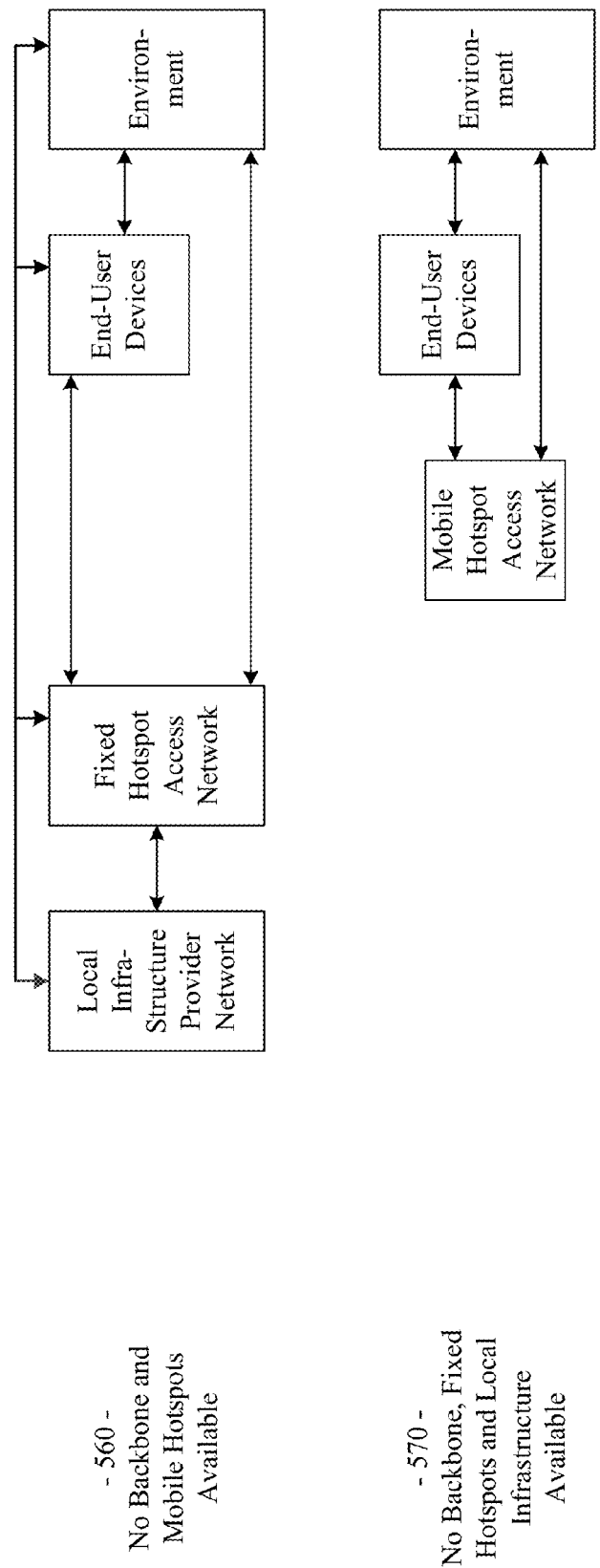

The example network 100 illustrated in FIG. 1 has a flexible architecture that is adaptable at implementation time (e.g., for different use cases) and/or adaptable in real-time, for example as network components enter and leave service. FIGS. 5A-5C illustrate such flexibility by providing example modes (or configurations). The example networks 500-570 may, for example, share any or all characteristics with the other example networks and/or network components 100, 200, 300, 400, 500-570, 600, 700, 800, 900, 1000, 1100, and 1200 discussed herein. For example and without limitation, any or all of the communication links (e.g., wired links, wireless links, etc.) shown in the example networks 500-570 are generally analogous to similarly positioned communication links shown in the example network 100 of FIG. 1.

For example, various aspects of this disclosure provide communication network architectures, systems, and methods for supporting a dynamically configurable communication network comprising a complex array of both static and moving communication nodes (e.g., the Internet of moving things). For example, a communication network implemented in accordance with various aspects of the present disclosure may operate in one of a plurality of modalities comprising various fixed nodes, mobile nodes, and/or a combination thereof, which are selectable to yield any of a variety of system goals (e.g., increased throughput, reduced latency and packet loss, increased availability and robustness of the system, extra redundancy, increased responsiveness, increased security in the transmission of data and/or control packets, reduced number of configuration changes by incorporating smart thresholds (e.g., change of technology, change of certificate, change of IP, etc.), providing connectivity in dead zones or zones with difficult access, reducing the costs for maintenance and accessing the equipment for updating/upgrading, etc.). At least some of such modalities may, for example, be entirely comprised of fixed-position nodes, at least temporarily if not permanently.

For illustrative simplicity, many of the example aspects shown in the example system or network 100 of FIG. 1 (and other Figures herein) are omitted from FIGS. 5A-5C, but may be present. For example, the Cloud, Internet, and ISP aspects shown in FIG. 1 and in other Figures are not explicitly shown in FIGS. 5A-5C, but may be present in any of the example configurations (e.g., as part of the backbone provider network or coupled thereto, as part of the local infrastructure provider network or coupled thereto, etc.).

For example, the first example mode 500 is presented as a normal execution mode, for example a mode (or configuration) in which all of the components discussed herein are present. For example, the communication system in the first example mode 500 comprises a backbone provider network, a local infrastructure provider network, a fixed hotspot access network, a mobile hotspot access network, end-user devices, and environment devices.

As shown in FIG. 5A, and in FIG. 1 in more detail, the backbone provider network may be communicatively coupled to any or all of the other elements present in the first example mode 500 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via a wired link. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the first example mode 500 (or configuration) via one or more wireless links (e.g., RF link, non-tethered optical link, etc.). For example, the backbone provider network may be communicatively coupled to the fixed hotspot access network (or any component thereof), the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

Though not shown in the first example mode 500 (or any of the example modes of FIGS. 5A-5C), one or more servers may be communicatively coupled to the backbone provider network and/or the local infrastructure network. FIG. 1 provides an example of Cloud servers being communicatively coupled to the backbone provider network via the Internet.

As additionally shown in FIG. 5A, and in FIG. 1 in more detail, the local infrastructure provider network may be communicatively coupled to any or all of the other elements present in the first example mode 500 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the first example mode 500 (or configuration) via one or more wireless links (e.g., RF link, non-tethered optical link, etc.). For example, the local infrastructure provider network may be communicatively coupled to the backbone provider network (or any component thereof), the fixed hotspot access network (or any component thereof), the mobile hotspot access network (or any component thereof), the end-user devices, and/or environment devices via one or more wireless links. Note that the communication link shown in the first example mode 500 of FIG. 5A between the local infrastructure provider network and the fixed hotspot access network may be wired and/or wireless.

The fixed hotspot access network is also shown in the first example mode 500 to be communicatively coupled to the mobile hotspot access network, the end-user devices, and/or environment devices via one or more wireless links. Many examples of such wireless coupling are provided herein. Additionally, the mobile hotspot access network is further shown in the first example mode 500 to be communicatively coupled to the end-user devices and/or environment devices via one or more wireless links. Many examples of such wireless coupling are provided herein. Further, the end-user devices are also shown in the first example mode 500 to be communicatively coupled to the environment devices via one or more wireless links. Many examples of such wireless coupling are provided herein. Note that in various example implementations any of such wireless links may instead (or in addition) comprise a wired (or tethered) link.

In the first example mode 500 (e.g., the normal mode), information (or data) may be communicated between an end-user device and a server (e.g., a computer system) via the mobile hotspot access network, the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network, the local infrastructure provider network, and/or the backbone provider network (e.g., skipping the mobile hotspot access network). Also for example, information communicated between an end user device and a server may be communicated via the backbone provider network (e.g., skipping the mobile hotspot access network, fixed hotspot access network, and/or local infrastructure provider network).

Similarly, in the first example mode 500 (e.g., the normal mode), information (or data) may be communicated between an environment device and a server via the mobile hotspot access network, the fixed hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network, the local infrastructure provider network, and/or the backbone provider network (e.g., skipping the mobile hotspot access network). Also for example, information communicated between an environment device and a server may be communicated via the backbone provider network (e.g., skipping the mobile hotspot access network, fixed hotspot access network, and/or local infrastructure provider network). Additionally for example, information communicated between an environment device and a server may be communicated via the local infrastructure provider network (e.g., skipping the mobile hotspot access network and/or fixed hotspot access network).

As discussed herein, the example networks presented herein are adaptively configurable to operate in any of a variety of different modes (or configurations). Such adaptive configuration may occur at initial installation and/or during subsequent controlled network evolution (e.g., adding or removing any or all of the network components discussed herein, expanding or removing network capacity, adding or removing coverage areas, adding or removing services, etc.). Such adaptive configuration may also occur in real-time, for example in response to real-time changes in network conditions (e.g., networks or components thereof being available or not based on vehicle or user-device movement, network or component failure, network or component replacement or augmentation activity, network overloading, etc.). The following example modes are presented to illustrate characteristics of various modes in which a communication system may operate in accordance with various aspects of the present disclosure. The following example modes will generally be discussed in relation to the first example mode 500 (e.g., the normal execution mode). Note that such example modes are merely illustrative and not limiting.

The second example mode (or configuration) 510 (e.g., a no backbone available mode) may, for example, share any or all characteristics with the first example mode 500, albeit without the backbone provider network and communication links therewith. For example, the communication system in the second example mode 510 comprises a local infrastructure provider network, a fixed hotspot access network, a mobile hotspot access network, end-user devices, and environment devices.

As shown in FIG. 5A, and in FIG. 1 in more detail, the local infrastructure provider network may be communicatively coupled to any or all of the other elements present in the second example mode 510 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the second example mode 510 (or configuration) via one or more wireless links (e.g., RF link, non-tethered optical link, etc.). For example, the local infrastructure provider network may be communicatively coupled to the fixed hotspot access network (or any component thereof), the mobile hotspot access network (or any component thereof), the end-user devices, and/or environment devices via one or more wireless links. Note that the communication link(s) shown in the second example mode 510 of FIG. 5A between the local infrastructure provider network and the fixed hotspot access network may be wired and/or wireless.

The fixed hotspot access network is also shown in the second example mode 510 to be communicatively coupled to the mobile hotspot access network, the end-user devices, and/or environment devices via one or more wireless links. Many examples of such wireless coupling are provided herein. Additionally, the mobile hotspot access network is further shown in the second example mode 510 to be communicatively coupled to the end-user devices and/or environment devices via one or more wireless links. Many examples of such wireless coupling are provided herein. Further, the end-user devices are also shown in the second example mode 510 to be communicatively coupled to the environment devices via one or more wireless links. Many examples of such wireless coupling are provided herein. Note that in various example implementations any of such wireless links may instead (or in addition) comprise a wired (or tethered) link.

In the second example mode 510 (e.g., the no backbone available mode), information (or data) may be communicated between an end-user device and a server (e.g., a computer, etc.) via the mobile hotspot access network, the fixed hotspot access network, and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network and/or the local infrastructure provider network (e.g., skipping the mobile hotspot access network). Also for example, information communicated between an end user device and a server may be communicated via the local infrastructure provider network (e.g., skipping the mobile hotspot access network and/or fixed hotspot access network).

Similarly, in the second example mode 510 (e.g., the no backbone available mode), information (or data) may be communicated between an environment device and a server via the mobile hotspot access network, the fixed hotspot access network, and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network and/or the local infrastructure provider network (e.g., skipping the mobile hotspot access network). Also for example, information communicated between an environment device and a server may be communicated via the local infrastructure provider network (e.g., skipping the mobile hotspot access network and/or fixed hotspot access network).

The second example mode 510 may be utilized for any of a variety of reasons, non-limiting examples of which are provided herein. For example, due to security and/or privacy goals, the second example mode 510 may be utilized so that communication access to the public Cloud systems, the Internet in general, etc., is not allowed. For example, all network control and management functions may be within the local infrastructure provider network (e.g., wired local network, etc.) and/or the fixed access point network.

In an example implementation, the communication system might be totally owned, operated and/or controlled by a local port authority. No extra expenses associated with cellular connections need be spent. For example, cellular connection capability (e.g., in Mobile APs, Fixed APs, end user devices, environment devices, etc.) need not be provided. Note also that the second example mode 510 may be utilized in a scenario in which the backbone provider network is normally available but is currently unavailable (e.g., due to server failure, due to communication link failure, due to power outage, due to a temporary denial of service, etc.).

The third example mode (or configuration) 520 (e.g., a no local infrastructure and fixed hotspots available mode) may, for example, share any or all characteristics with the first example mode 500, albeit without the local infrastructure provider network, the fixed hotspot access network, and communication links therewith. For example, the communication system in the third example mode 520 comprises a backbone provider network, a mobile hotspot access network, end-user devices, and environment devices.

As shown in FIG. 5A, and in FIG. 1 in more detail, the backbone provider network may be communicatively coupled to any or all of the other elements present in the third example mode 520 (or configuration) via one or more wired (or tethered) links. For example, the backbone provider network may be communicatively coupled to the end-user devices and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the third example mode 520 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links.

The mobile hotspot access network is further shown in the third example mode 520 to be communicatively coupled to the end-user devices and/or environment devices via one or more wireless links. Many examples of such wireless coupling are provided herein. Further, the end-user devices are also shown in the third example mode 520 to be communicatively coupled to the environment devices via one or more wireless links. Many examples of such wireless coupling are provided herein. Note that in various example implementations any of such wireless links may instead (or in addition) comprise a wired (or tethered) link.

In the third example mode 520 (e.g., the no local infrastructure and fixed hotspots available mode), information (or data) may be communicated between an end-user device and a server (e.g., a computer, etc.) via the mobile hotspot access network and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the backbone provider network (e.g., skipping the mobile hotspot access network).

Similarly, in the third example mode 520 (e.g., the no local infrastructure and fixed hotspots available mode), information (or data) may be communicated between an environment device and a server via the mobile hotspot access network and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the backbone provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the backbone provider network (e.g., skipping the mobile hotspot access network).

In the third example mode 520, all control/management functions may for example be implemented within the Cloud. For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The third example mode 520 may be utilized for any of a variety of reasons, non-limiting examples of which are provided herein. In an example implementation, the third example mode 520 may be utilized in an early stage of a larger deployment, for example deployment that will grow into another mode (e.g., the example first mode 500, example fourth mode 530, etc.) as more communication system equipment is installed. Note also that the third example mode 520 may be utilized in a scenario in which the local infrastructure provider network and fixed hotspot access network are normally available but are currently unavailable (e.g., due to equipment failure, due to communication link failure, due to power outage, due to a temporary denial of service, etc.).

The fourth example mode (or configuration) 530 (e.g., a no fixed hotspots available mode) may, for example, share any or all characteristics with the first example mode 500, albeit without the fixed hotspot access network and communication links therewith. For example, the communication system in the fourth example mode 530 comprises a backbone provider network, a local infrastructure provider network, a mobile hotspot access network, end-user devices, and environment devices.

As shown in FIG. 5B, and in FIG. 1 in more detail, the backbone provider network may be communicatively coupled to any or all of the other elements present in the fourth example mode 530 (or configuration) via one or more wired (or tethered) links. For example, the backbone provider network may be communicatively coupled to the local infrastructure provider network (or any component thereof), the end-user devices, and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5B, and in FIG. 1 in more detail, the backbone provider network may be communicatively coupled to any or all of the other elements present in the fourth example mode 530 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fourth example mode 530 (or configuration) via one or more wired (or tethered) links. For example, the local infrastructure provider network may be communicatively coupled to the backbone provider network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fourth example mode 530 (or configuration) via one or more wireless links (e.g., RF link, non-tethered optical link, etc.). For example, the local infrastructure provider network may be communicatively coupled to the backbone provider network (or any component thereof), the mobile hotspot access network (or any component thereof), the end-user devices, and/or environment devices via one or more wireless links.

The mobile hotspot access network is further shown in the fourth example mode 530 to be communicatively coupled to the end-user devices and/or environment devices via one or more wireless links. Many examples of such wireless coupling are provided herein. Further, the end-user devices are also shown in the fourth example mode 530 to be communicatively coupled to the environment devices via one or more wireless links. Many examples of such wireless coupling are provided herein.

In the fourth example mode 530 (e.g., the no fixed hotspots mode), information (or data) may be communicated between an end-user device and a server via the mobile hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network and/or the backbone provider network (e.g., skipping the mobile hotspot access network). Also for example, information communicated between an end user device and a server may be communicated via the backbone provider network (e.g., skipping the mobile hotspot access network and/or local infrastructure provider network).

Similarly, in the fourth example mode 530 (e.g., the no fixed hotspots available mode), information (or data) may be communicated between an environment device and a server via the mobile hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the mobile hotspot access network). Also for example, information communicated between an environment device and a server may be communicated via the backbone provider network (e.g., skipping the mobile hotspot access network and/or local infrastructure provider network). Additionally for example, information communicated between an environment device and a server may be communicated via the local infrastructure provider network (e.g., skipping the mobile hotspot access network and/or backbone provider network).

In the fourth example mode 530, in an example implementation, some of the control/management functions may for example be implemented within the local backbone provider network (e.g., within a client premises). For example, communication to the local infrastructure provider may be performed through the backbone provider network (or Cloud). Note that in a scenario in which there is a direct communication pathway between the local infrastructure provider network and the mobile hotspot access network, such communication pathway may be utilized.

For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The fourth example mode 530 may be utilized for any of a variety of reasons, non-limiting examples of which are provided herein. In an example implementation, the fourth example mode 530 may be utilized in an early stage of a larger deployment, for example a deployment that will grow into another mode (e.g., the example first mode 500, etc.) as more communication system equipment is installed. The fourth example mode 530 may, for example, be utilized in a scenario in which there is no fiber (or other) connection available for Fixed APs (e.g., in a maritime scenario, in a plantation scenario, etc.), or in which a Fixed AP is difficult to access or connect. For example, one or more Mobile APs of the mobile hotspot access network may be used as gateways to reach the Cloud. The fourth example mode 530 may also, for example, be utilized when a vehicle fleet and/or the Mobile APs associated therewith are owned by a first entity and the Fixed APs are owned by another entity, and there is no present agreement for communication between the Mobile APs and the Fixed APs. Note also that the fourth example mode 530 may be utilized in a scenario in which the fixed hotspot access network is normally available but are currently unavailable (e.g., due to equipment failure, due to communication link failure, due to power outage, due to a temporary denial of service, etc.).

The fifth example mode (or configuration) 540 (e.g., a no mobile hotspots available mode) may, for example, share any or all characteristics with the first example mode 500, albeit without the mobile hotspot access network and communication links therewith. For example, the communication system in the fifth example mode 540 comprises a backbone provider network, a local infrastructure provider network, a fixed hotspot access network, end-user devices, and environment devices.

As shown in FIG. 5B, and in FIG. 1 in more detail, the backbone provider network may be communicatively coupled to any or all of the other elements present in the fifth example mode 540 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via one or more wired links. Note that such a wired coupling may be temporary.

Also shown in FIG. 5B, and in FIG. 1 in more detail, the backbone provider network may be communicatively coupled to any or all of the other elements present in the fifth example mode 540 (or configuration) via one or more wireless links (e.g., RF link, non-tethered optical link, etc.). For example, the backbone provider network may be communicatively coupled to the fixed hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fifth example mode 540 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fifth example mode 540 (or configuration) via one or more wireless links (e.g., RF link, non-tethered optical link, etc.). For example, the local infrastructure provider network may be communicatively coupled to the backbone provider network, the fixed hotspot access network (or any component thereof), the end-user devices, and/or environment devices via one or more wireless links. Note that the communication link(s) shown in the fifth example mode 540 of FIG. 5B between the local infrastructure provider network and the fixed hotspot access network may be wired and/or wireless.

The fixed hotspot access network is also shown in the fifth example mode 540 to be communicatively coupled to the end-user devices and/or environment devices via one or more wireless links. Many examples of such wireless coupling are provided herein. Further, the end-user devices are also shown in the fifth example mode 540 to be communicatively coupled to the environment devices via one or more wireless links. Many examples of such wireless coupling are provided herein.

In the fifth example mode 540 (e.g., the no mobile hotspots available mode), information (or data) may be communicated between an end-user device and a server via the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network, and/or the backbone provider network (e.g., skipping the fixed hotspot access network). Also for example, information communicated between an end user device and a server may be communicated via the backbone provider network (e.g., skipping the fixed hotspot access network and/or local infrastructure provider network).

Similarly, in the fifth example mode 540 (e.g., the no mobile hotspots available mode), information (or data) may be communicated between an environment device and a server via the fixed hotspot access network, the local infrastructure provider network, and/or the backbone provider network. Also for example, an environment device may communicate with or through an end-user device (e.g., instead of or in addition to the fixed hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the fixed hotspot access network). Also for example, information communicated between an environment device and a server may be communicated via the backbone provider network (e.g., skipping the fixed hotspot access network and/or local infrastructure provider network). Additionally for example, information communicated between an environment device and a server may be communicated via the local infrastructure provider network (e.g., skipping the fixed hotspot access network and/or the backbone provider network).

In the fifth example mode 540, in an example implementation, the end-user devices and environment devices may communicate directly to Fixed APs (e.g., utilizing Ethernet, Wi-Fi, etc.). Also for example, the end-user devices and/or environment devices may communicate directly with the backbone provider network (e.g., utilizing cellular connections, etc.).

The fifth example mode 540 may be utilized for any of a variety of reasons, non-limiting examples of which are provided herein. In an example implementation in which end-user devices and/or environment devices may communicate directly with Fixed APs, such communication may be utilized instead of Mobile AP communication. For example, the fixed hotspot access network might provide coverage for all desired areas.

Note also that the fifth example mode 540 may be utilized in a scenario in which the fixed hotspot access network is normally available but is currently unavailable (e.g., due to equipment failure, due to communication link failure, due to power outage, due to a temporary denial of service, etc.).

The sixth example mode (or configuration) 550 (e.g., the no fixed/mobile hotspots and local infrastructure available mode) may, for example, share any or all characteristics with the first example mode 500, albeit without the local infrastructure provider network, fixed hotspot access network, mobile hotspot access network, and communication links therewith. For example, the communication system in the sixth example mode 550 comprises a backbone provider network, end-user devices, and environment devices.

As shown in FIG. 5B, and in FIG. 1 in more detail, the backbone provider network may be communicatively coupled to any or all of the other elements present in the sixth example mode 550 (or configuration) via one or more wired (or tethered) links. For example, the backbone provider network may be communicatively coupled to the end-user devices and/or environment devices via one or more wired links. Note that such a wired coupling may be temporary.

Also shown in FIG. 5B, and in FIG. 1 in more detail, the backbone provider network may be communicatively coupled to any or all of the other elements present in the sixth example mode 550 (or configuration) via one or more wireless links (e.g., RF link, non-tethered optical link, etc.). For example, the backbone provider network may be communicatively coupled to the end-user devices and/or environment devices via one or more wireless links.

The end-user devices are also shown in the sixth example mode 550 to be communicatively coupled to the environment devices via one or more wireless links. Many examples of such wireless coupling are provided herein.

In the sixth example mode 550 (e.g., the no fixed/mobile hotspots and local infrastructure available mode), information (or data) may be communicated between an end-user device and a server via the backbone provider network. Similarly, in the sixth example mode 550 (e.g., the no fixed/mobile hotspots and local infrastructure mode), information (or data) may be communicated between an environment device and a server via the backbone provider network. Also for example, an environment device may communicate with or through an end-user device (e.g., instead of or in addition to the mobile hotspot access network).

The sixth example mode 550 may be utilized for any of a variety of reasons, non-limiting examples of which are provided herein. In an example implementation, for example in which an end-user has not yet subscribed to the communication system, the end-user device may subscribe to the system through a Cloud application and by communicating directly with the backbone provider network (e.g., via cellular link, etc.). The sixth example mode 550 may also, for example, be utilized in rural areas in which Mobile AP presence is sparse, Fixed AP installation is difficult or impractical, etc.

Note also that the sixth example mode 550 may be utilized in a scenario in which the infrastructure provider network, fixed hotspot access network, and/or mobile hotspot access network are normally available but are currently unavailable (e.g., due to equipment failure, due to communication link failure, due to power outage, due to a temporary denial of service, etc.).

The seventh example mode (or configuration) 560 (e.g., the no backbone and mobile hotspots available mode) may, for example, share any or all characteristics with the first example mode 500, albeit without the backbone provider network, mobile hotspot access network, and communication links therewith. For example, the communication system in the seventh example mode 560 comprises a local infrastructure provider network, fixed hotspot access network, end-user devices, and environment devices.

As shown in FIG. 5C, and in FIG. 1 in more detail, the local infrastructure provider network may be communicatively coupled to any or all of the other elements present in the seventh example mode 560 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary.

Also, though not explicitly shown, the local infrastructure provider network may be communicatively coupled to any or all of the other elements present in the seventh example mode 560 (or configuration) via one or more wireless links (e.g., RF link, non-tethered optical link, etc.). For example, the local infrastructure provider network may be communicatively coupled to the fixed hotspot access network (or any component thereof), the end-user devices, and/or environment devices via one or more wireless links. Note that the communication link shown in the seventh example mode 560 of FIG. 5C between the local infrastructure provider network and the fixed hotspot access network may be wired and/or wireless.

The fixed hotspot access network is also shown in the seventh example mode 560 to be communicatively coupled to the end-user devices and/or environment devices via one or more wireless links. Many examples of such wireless coupling are provided herein. Additionally, the end-user devices are also shown in the seventh example mode 560 to be communicatively coupled to the environment devices via one or more wireless links. Many examples of such wireless coupling are provided herein.

In the seventh example mode 560 (e.g., the no backbone and mobile hotspots available mode), information (or data) may be communicated between an end-user device and a server via the fixed hotspot access network and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network (e.g., skipping the fixed hotspot access network).

Similarly, in the seventh example mode 560 (e.g., the no backbone and mobile hotspots available mode), information (or data) may be communicated between an environment device and a server via the fixed hotspot access network and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the local infrastructure provider network (e.g., skipping the fixed hotspot access network).

The seventh example mode 560 may be utilized for any of a variety of reasons, non-limiting examples of which are provided herein. In an example controlled space implementation, Cloud access might not be provided (e.g., for security reasons, privacy reasons, etc.), and full (or sufficient) coverage of the coverage area is provided by the fixed hotspot access network, and thus the mobile hotspot access network is not needed. For example, the end-user devices and environment devices may communicate directly (e.g., via Ethernet, Wi-Fi, etc.) with the Fixed APs Note also that the seventh example mode 560 may be utilized in a scenario in which the backbone provider network and/or fixed hotspot access network are normally available but are currently unavailable (e.g., due to equipment failure, due to communication link failure, due to power outage, due to a temporary denial of service, etc.).

The eighth example mode (or configuration) 570 (e.g., the no backbone, fixed hotspots, and local infrastructure available mode) may, for example, share any or all characteristics with the first example mode 500, albeit without the backbone provider network, local infrastructure provider network, fixed hotspot access network, and communication links therewith. For example, the communication system in the eighth example mode 570 comprises a mobile hotspot access network, end-user devices, and environment devices.

As shown in FIG. 5C, and in FIG. 1 in more detail, the mobile hotspot access network is shown in the eighth example mode 570 to be communicatively coupled to the end-user devices and/or environment devices via one or more wireless links. Many examples of such wireless coupling are provided herein. Further, the end-user devices are also shown in the eighth example mode 570 to be communicatively coupled to the environment devices via one or more wireless links. Many examples of such wireless coupling are provided herein.

In the eighth example mode 570 (e.g., the no backbone, fixed hotspots, and local infrastructure available mode), information (or data) might not (at least currently) be communicated between an end-user device and a server (e.g., a coupled to the backbone provider network, local infrastructure provider network, etc.). Similarly, information (or data) might not (at least currently) be communicated between an environment device and a server (e.g., a coupled to the backbone provider network, local infrastructure provider network, etc.). Note that the environment device may communicate with or through an end-user device (e.g., instead of or in addition to the mobile hotspot access network).

The eighth example mode 570 may be utilized for any of a variety of reasons, non-limiting examples of which are provided herein. In an example implementation, the eighth example mode 570 may be utilized for gathering and/or serving data (e.g., in a delay-tolerant networking scenario), providing peer-to-peer communication through the mobile hotspot access network (e.g., between clients of a single Mobile AP, between clients of respective different Mobile APs, etc.), etc. In another example scenario, the eighth example mode 570 may be utilized in a scenario in which vehicle-to-vehicle communications are prioritized above vehicle-to-infrastructure communications. In yet another example scenario, the eighth example mode 570 may be utilized in a scenario in which all infrastructure access is lost (e.g., in tunnels, parking garages, etc.).

Note also that the eighth example mode 570 may be utilized in a scenario in which the backbone provider network, local infrastructure provider network, and/or fixed hotspot access network are normally available but are currently unavailable (e.g., due to equipment failure, due to communication link failure, due to power outage, due to a temporary denial of service, etc.).

As shown and discussed herein, it is beneficial to have a generic platform that allows multi-mode communications of multiple users or machines within different environments, using multiple devices with multiple technologies, connected to multiple moving/static things with multiple technologies, forming wireless (mesh) hotspot networks over different environments, connected to multiple wired/wireless infrastructure/network backbone providers, ultimately connected to the Internet, Cloud or private network infrastructure.

Figure 6:
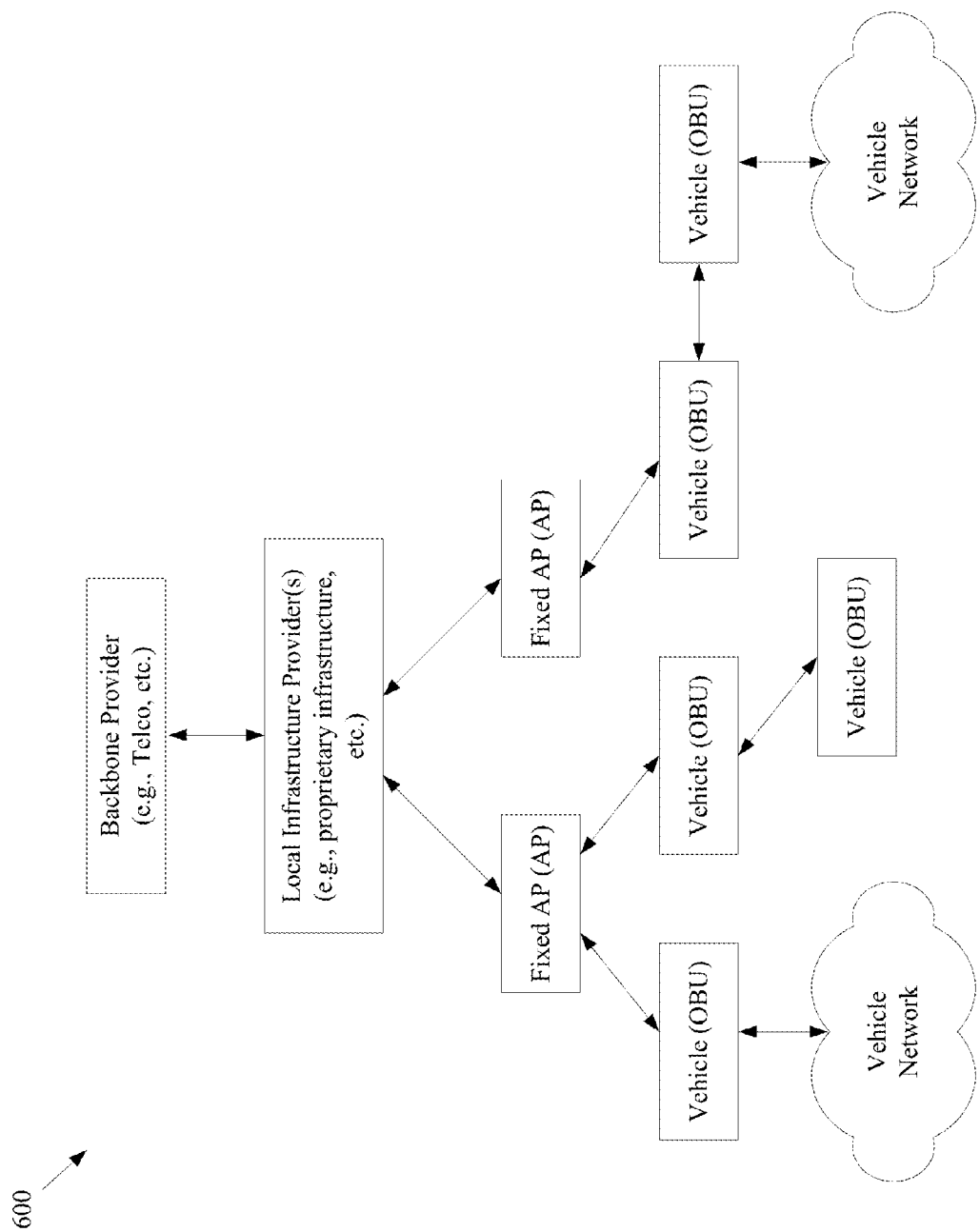
FIG. 6 shows a block diagram of an example communication network, in accordance with various aspects of the present disclosure.

FIG. 6 shows yet another block diagram of an example network configuration, in accordance with various aspects of the present disclosure. The example network 600 may, for example, share any or all characteristics with the other example networks and/or network components 100, 200, 300, 400, 500-570, 700, 800, 900, 1000, 1100, and 1200 discussed herein. Notably, the example network 600 shows a plurality of Mobile APs (or OBUs), each communicatively coupled to a Fixed AP (or RSU), where each Mobile AP may provide network access to a vehicle network (e.g., comprising other vehicles or vehicle networks, user devices, sensor devices, etc.).

Figure 7:
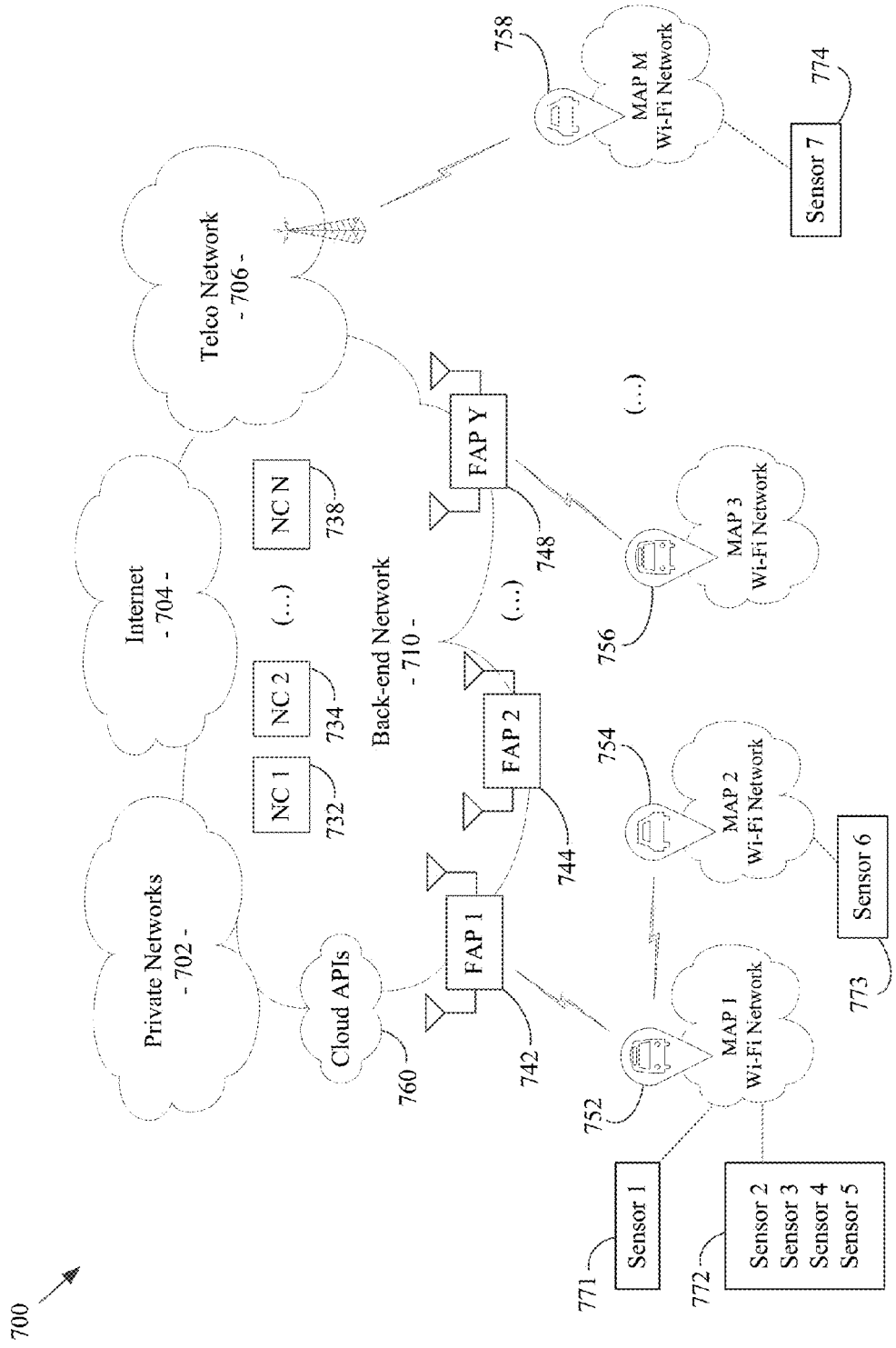
FIG. 7 shows a block diagram of an example communication network, in accordance with various aspects of the present disclosure.

FIG. 7 shows still another block diagram of an example communication network 700, in accordance with various aspects of the present disclosure. The example network 700 may, for example, share any or all characteristics with the other example networks and/or network components 100, 200, 300, 400, 500-570, 600, 800, 900, 1000, 1100, and 1200 discussed herein. Notably, the example network 700 shows a plurality of vehicles (or Mobile APs, or MAPs, or OBUs) 752, 754, 756, and 758, each communicatively coupled to a Fixed AP (or RSU) 742, 744, and 748 and/or a cellular network 706, where each Mobile AP may provide network access to a vehicle network (e.g., comprising other vehicles or vehicle networks, user devices, sensor devices, etc.), for example a Wi-Fi network to which end user devices may connect, with which communication with sensors may be performed, etc. The example network 700 may also, for example, comprise a plurality of Network Controllers 732, 734, and 738. The example network 700 may also, for example, comprise any of a variety of interconnected networks (e.g., Private Networks 702, the Internet 704, Telecommunication Networks 706, etc.). One or more servers of the Cloud may, for example, be accessible via Cloud APIs 760.

The Mobile APs 752, 754, 756, and 758 may, for example, be communicatively coupled to various sensors (e.g., always, as the Mobile APs travel within range of such sensors, etc.). For example, in the example scenario shown in FIG. 7, a first MAP 752 is communicatively coupled to a first sensor 771 (e.g., Sensor 1) and a set of sensors 772 (e.g., Sensor 2, Sensor 3, Sensor 4, and Sensor 5), which may for example be co-located; a second MAP 754 is communicatively coupled to a sixth sensor 773; and an $M^{th}$ MAP 758 is communicatively coupled to a seventh sensor 774. The Mobile APs may, for example move in and out of communication range of the various sensors. The Mobile APs may, for example when in-range of such sensors, gather information from such sensors in a power-efficient and network-efficient manner, many examples of which are provided herein.

As discussed herein, sensors can economically measure a large variety parameters, for example from environmental conditions like temperature, humidity, barometric pressure, insulation, noise, pollution levels, gas, particles, rain, etc., to the behavior of people and objects. Deploying sensors can however be expensive, particularly when they require a fixed connection to a power source and/or a wired link for communication. To efficiently collect data from sensors and transport the collected data to the Cloud, a communication network in accordance with various aspects of this disclosure (e.g., a network or Internet of Moving Things) may be utilized as a communication backbone. For example, in an example implementation, a vehicle equipped with a mobile access point (or Mobile AP, or MAP, or OBU) can communicate with a sensor as the vehicle passes or parks nearby. Collected sensor data can be stored and processed and made available to/from the Cloud (e.g., via APIs or other interfaces). Additionally, collected sensor data may be gathered and processed locally (e.g., at the Mobile AP). Non-limiting examples of systems and methods for collecting sensor data, for example in a network of moving things, are provided in U.S. Provisional Application No. 62/222,135, titled "SYSTEMS AND METHODS FOR COLLECTING SENSOR DATA IN A NETWORK OF MOVING THINGS," filed on Sep. 22, 2015, the entire content of which is hereby incorporated by reference in its entirety.

In accordance with various aspects of the present disclosure, systems and methods are provided that utilize one or more mobile access points to gather (or harvest) data from sensors. Various aspects of this disclosure provide for cooperation among APs and sensors to optimize the data collection in various ways (e.g., maximizing throughput, minimizing latency, maximizing reliability, adjusting the data collection parameters such as resolution and/or QoS rules and/or sample interval, utilizing geographical information for sensor data collection planning, minimizing unnecessary redundancy in data collecting, etc.). Such data collection may, for example, be adjusted dynamically in response to various conditions (e.g., weather, time-of-day, day-of-year, external events, security issues, emergency conditions, client and/or operator directives, etc.).

A communication network, in accordance with various aspects of the present disclosure, may then transport the collected sensor data to the Cloud or any other node in various ways (e.g., utilizing any of a variety of communication technologies, utilizing any of a variety of pathways through the network, utilizing delay-tolerance networking, utilizing opportunistic uploads for example via Wi-Fi networks, communicating such data in accordance with various QoS rules, etc.).

In a network in which mobile nodes (e.g., Mobile APs, user devices, etc.) are utilized to collect (or gather) sensor data, sources of such data (e.g., stationary and/or mobile sensors, other data sources, etc.) may be numerous and the volume of such data may be great. Over time, it is expected that the network of moving things will result in a rapid increase in the amount of sensor data collected (e.g., in a metropolitan area). Such increases in the volume of data, however, present data collecting, storage, processing, and communication challenges.

In an example scenario in which there is too much data for one or more Mobile APs to handle, some data may be lost (e.g., not collected at all, only partially collected, collected with errors, etc.). Other data may be collected, but not in a timely manner. For example, a Mobile AP may fail or be overwhelmed if operated autonomously in accordance with an inflexible data collection strategy (or plan). Fortunately, a network of moving things provides the flexibility and/or adaptability to respond to unforeseen system disturbances, data collecting needs, system and/or sensor topology changes, etc. Such flexibility may, for example, provide for the necessary or desired amount of data to be collected.

Figure 8:
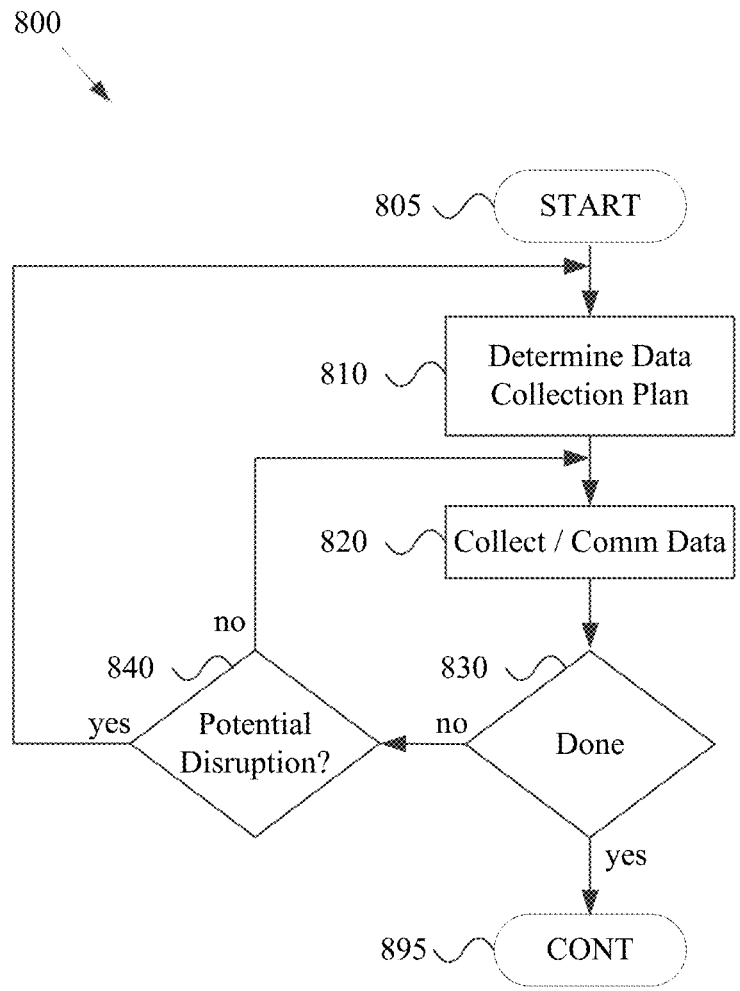
FIG. 8 shows a flow diagram of an example method of collecting data in a network of moving things, in accordance with various aspects of the present disclosure.

In an example implementation, data collection by the network of moving things (or any component thereof) may initially be operated in accordance with an original plan, for example corresponding to a particular vehicle, vehicle route for a shift (e.g., for a minute, for an hour, for a day, for some other period of time, etc.), etc. The original plan may then, for example, be adjusted or adapted in real-time based on any of a variety of conditions that may be deemed significant enough to modify the original plan. FIG. 8 shows a non-limiting example of such operation. It should be noted that the scope of this disclosure is not limited by characteristics of such specific example nor by any specific examples discussed herein.

FIG. 8 shows a flow diagram of an example method 800 of collecting data in a network of moving things, in accordance with various aspects of the present disclosure. Any or all aspects of the example method 800 may, for example, be implemented in any of a variety of network components discussed herein (e.g., in a Mobile AP or OBU, in a Fixed AP or RSU, in a mobile user device, etc.). Additionally for example, the functionality of the example method 800 may be distributed among any two or more of the network components discussed herein.

The example method 800 may, for example, begin executing at block 805. The example method 800 may begin executing in response to any of a variety of causes or conditions. For example, the method 800 may begin executing in preparation for a vehicle comprising a Mobile AP beginning a route or shift. Also for example, the method 800 may begin executing on a timed schedule (e.g., an absolute start and/or update time, periodically with a consistent and/or varying period, in response to a user command, while a vehicle is being maintained, while a vehicle is parked in a garage, in response to a power-up condition, in response to an engine starting, in response to a vehicle beginning to move, etc.). Accordingly, the scope of this disclosure is not limited by characteristics any particular initiating cause or condition.

The example method 800 may, at block 810, comprise determining a data collection plan. Block 810 may comprise determining a data collection plan (e.g., for a Mobile AP, Fixed AP, etc.) in any of a variety of manners, non-limiting examples of which are provided herein. For example, block 810 may comprise requesting and/or receiving a data collection plan from a central controller (e.g., an application executing on a server in the Cloud, an application executing on any other communication network node, etc.). In an example scenario, a central controller (e.g., with a model of the entire network and/or with knowledge of all data collection needs) may communicate a data collection plan to all nodes involved in such collection. Such communication (or propagation) may, for example, comprise a push system and/or pull system.

Also for example, block 810 may comprise retrieving (or otherwise accessing) a data collection plan stored in an on-board memory. In an example implementation, a node may comprise utilizing a prior data collection plan (e.g., as a baseline and/or default plan), for example a plan from a previous shift, a plan from a previous day, a plan from when the present route was most recently run, etc. Additionally for example, block 810 may comprise retrieving a data collection plan associated with a route that the node (e.g., comprising a Mobile AP) is to follow. For example, a database of fleet vehicle routes and respective data collection plans may be maintained, and accessed by vehicles (or their Mobile APs) when a route is assigned.

Additionally for example, block 810 may comprise receiving a data collection plan from a peer node. For example, a Mobile AP may receive a data collection plan from another Mobile AP, for example a Mobile AP that has most recently ran a route. In such a manner, the Mobile AP may also receive a status for the received data collection plan that indicates data that was recently collected and might not need to be collected by the Mobile AP (e.g., during this run).

In a further example, block 810 may comprise a plurality of nodes (e.g., Mobile APs and/or Fixed APs, etc.) selecting and/or negotiating which node will perform particular data collections. For example, a plurality of vehicle nodes (e.g., Mobile APs, etc.) that plan to be passing by (and/or are capable of passing by) a particular data source during a period of time may communicate with each other to determine which node will collect the data from such source. For example, a plurality of such nodes may communicate with each other regarding remaining resource capacity (e.g., memory resources, processing resources, communication resources, etc.) and determine among themselves which of such nodes has the most remaining capacity and should perform the data collection. The nodes may make this decision without central control. Note, however, that a central controller may also make the determination and communicate such determination to the relevant node(s). Such communication and/or determination may occur before running a route and/or during running a route (e.g., as a Mobile AP is approaching or expecting to approach a known sensor location). Also note that a node may make a data collection determination autonomously, for example if the node realizing the need for the data collection and/or data collection modification has enough excess capacity that it is not concerning enough to involve other nodes.

Figure 9:
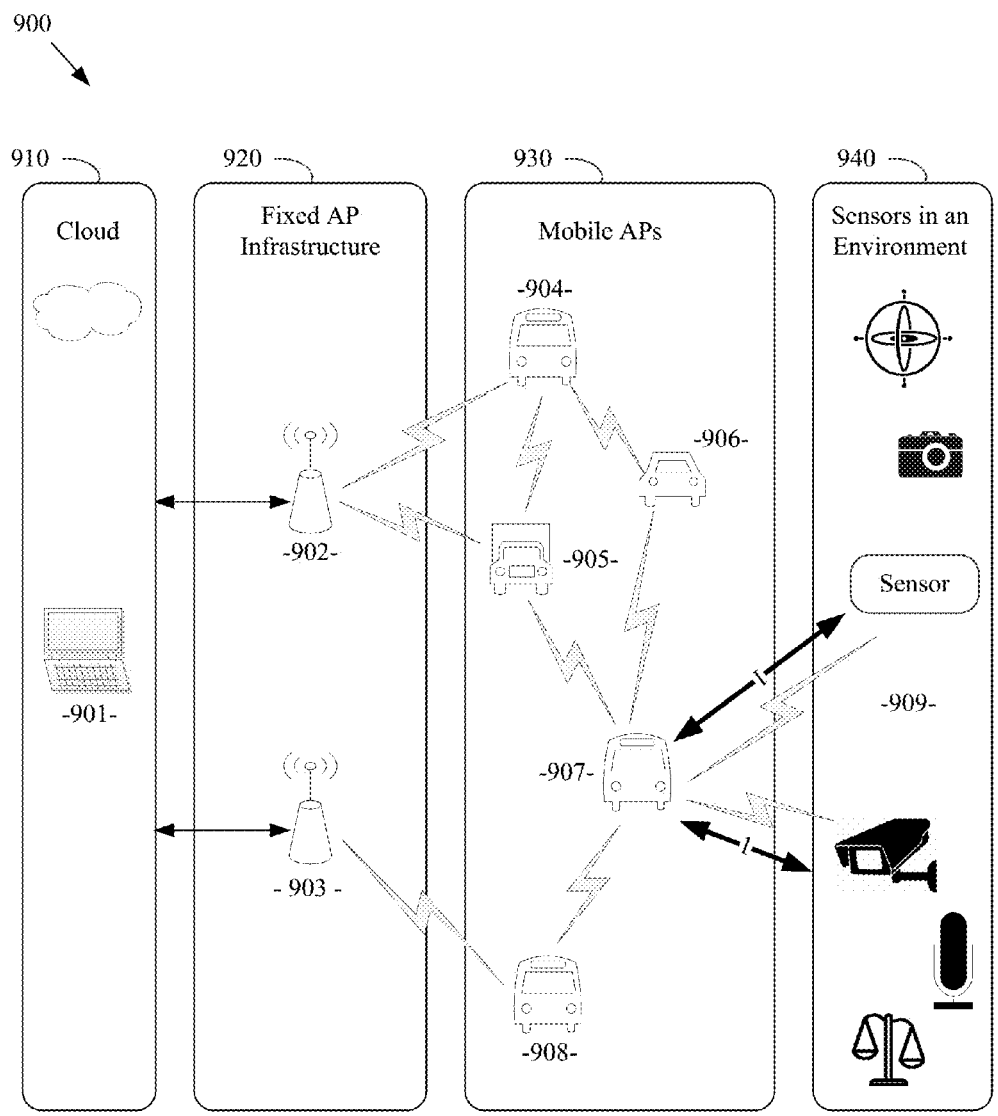
FIG. 9 shows a block diagram of an example AP system for interfacing with a sensor system, in accordance with various aspects of the present disclosure.

FIG. 9 shows a block diagram of an example AP system for interfacing with a sensor system, in accordance with various aspects of the present disclosure. FIG. 9, for example, shows various communication links between various network nodes (e.g., Cloud nodes, fixed infrastructure nodes, mobile infrastructure nodes, sensors, etc.) that may communicate to determine a data collection strategy. The example network 900 comprises the Cloud 910, which includes a computer (or server) 901. The example network 900 also comprises a Fixed AP Infrastructure 920 that comprises a first Fixed AP 902 and a second Fixed AP 903 that is communicatively coupled to the Cloud 910. The example network 900 additionally comprises a Mobile AP network 930 that comprises a plurality of Mobile APs 904-908 that are directly and/or indirectly communicatively coupled to the Fixed APs 902 and 903. The example Mobile AP 907 is shown communicatively coupled to one or more Sensors 909 of the Sensor Environment 940.

Returning to FIG. 8, as discussed herein, a data collection plan may be determined based on any one or more of a variety of factors. In an example implementation, an overall cost function may be minimized in determining an optimal data collection plan. The discussion herein provides various examples of factors that may be considered in determining such plan (or strategy). It should be noted that the factors discussed herein do not represent an exclusive list, and other factors may also be considered (e.g., instead of and/or in addition to the factors discussed herein).

The data collection plan may, for example, be determined based at least in part on network and/or sensor topology. For example, the locations of fixed (or generally fixed) sensors may be known or predictable, the location of Fixed AP nodes may be known, the travel patterns of Mobile APs may be known, etc. The data collection plan may thus be based on such knowledge, for example, correlating sensor data collecting goals (e.g., data collecting times, communication times, etc.) with potential data collecting nodes that are or are predicted to be available for the data collecting. As discussed herein, various data sources may be fixed, mobile, generally fixed but movable, etc. In such examples, a mobile data source may be predictably located, at least with a high enough degree of certainty to establish an initial data collection plan. Also as discussed herein, even a so-called fixed topology may change, so a data collection system in accordance with various aspects of this disclosure may adapt to fit the changing topology.

The data collection plan may also, for example, be determined based on historical information. For example, after a period of running, a substantial portion of the data collection operations may reach a steady state, in which each of a set of data gatherers (e.g., Mobile APs, etc.) may typically interact with a respective set of sensors (e.g., on a day-to-day basis). For example, a 06:15 bus might always interact with the garbage can sensors on its route (e.g., leaving the 06:30 bus and/or other subsequent buses as back-ups if the 06:15 bus misses some data). In such a scenario, barring a real-time disruption in the operation of the 06:15 bus and/or in the real-time context in which such bus is operating, the 06:15 bus may always be assigned to the collection of the garbage can sensor data. Note that, as discussed herein, historical and present operational information (and any data discussed herein) may be fed back into the system to adapt system models (e.g., system models utilized for determining the data collection plan, models for reacting to particular system operational disturbances or anomalies, etc.).

In another example, if a vehicle (e.g., running a particular route, operating during a particular time period, operating on a particular type of day, etc.) is historically associated with low resource (e.g., memory, processing, communication bandwidth, energy, etc.) utilization, a data collection plan may assign a relatively large amount of sensor data gathering activity to such vehicle (or Mobile AP). Alternatively, if a vehicle (e.g., running a particular route, operating during a particular time period, operating on a particular type of day, etc.) is historically associated with high resource (e.g., memory, processing, communication bandwidth, energy, etc.) utilization, a data collection plan may assign a relatively small amount of sensor data gathering responsibility to such vehicle, for example assigning such data gathering to other vehicles, fleets, times of day, etc.

As discussed herein (e.g., in the discussion of network topology, etc.) a data collection plan (or strategy) may also be based, at least in part, on expected contact time between a data gatherer (e.g., a Mobile AP, etc.) and a data source (e.g., a sensor system). For example, during a period of data gathering need, a set of one or more Mobile APs may each have a respective expected effective communication contact time with a data source (e.g., based on communication range, vehicle location, vehicle speed, expected vehicle trajectory, sensor location, expected communication data rate at a location, etc.). In an example scenario in which only one data gatherer is expected to be able to perform the data gathering, the data plan may assign such data gatherer to collect the data from such data source. In an example scenario in which a plurality of data gatherers are expected to be able to perform the data gathering, any or all of the other factors discussed herein may be utilized to select the assigned data gatherer from the set (e.g., identifying one or more data gather(s) that minimize an overall cost function, etc.). In another example, for example in which any single data gatherer is not expected to be able to collect all of the data from the source, a plurality of data gathers may be assigned to collect the data in aggregate, each collecting a respective portion. Note that as discussed herein, the nature of the data gathered may also be adapted (e.g., so that one gatherer may collect all of the necessary data, etc.).

A data collection plan may also be determined based, at least in part, on the amount of data to be collected (or processed, communicated, etc.) and/or on the amount of resources available to the data collecting node (e.g., memory resources, processing resources, energy resources, communication resources, etc.). For example, in an example scenario in which a first Mobile AP does not presently comprise the resources (e.g., communication resources, processing resources, memory resources, energy resources, etc.) and/or will not be within communication range of the data source long enough to communicate the data, the data collection may be passed to a second Mobile AP (e.g., instead of and/or in addition to the first Mobile AP). For example in an example scenario in which the data collection memory and/or communication resources for a Mobile AP are already allocated for other uses (e.g., for collecting data from other sources), the data collection for a particular source by which the Mobile AP is passing may be assigned to another Mobile AP, or alternatively the Mobile AP may be assigned to the data collection while another data collection previously assigned to the Mobile AP is re-assigned to another Mobile AP. Note that communication bandwidth resources between the data collecting node and the data source, the communication bandwidth resources between the data collecting node and a peer data collecting node, the communication bandwidth resources between the data collecting node and the network infrastructure, and/or the communication bandwidth resources between the data collecting node and an ultimate destination node for the collected data may be considered.

In an example scenario in which it is determined that a Mobile AP is unable to collect data from a particular sensor and communicate the collected data to a Cloud application within a required amount of time, such data collection being assigned to another data collecting node (or for example to additional nodes to perform an aggregate collection and communication of the data). In other words, in a scenario in which it is time-critical that collected data be communicated to a recipient, the data collection plan may be based, at least in part, on the respective latencies of different candidate data collecting nodes.

The data collection plan may, for example, be based at least in part on data priority. For example, in an example implementation, data collection responsibilities (or assignments) for the relatively high-priority data are assigned to data collecting nodes (e.g., Mobile APs, etc.) before data collection duties for the relatively low-priority data. As discussed herein, however, the priorities may change dynamically in response to real-time needs or conditions.

For example, in an example scenario in which a Mobile AP is on-board a waste collection vehicle, data collection associated with waste pick-up (e.g., garbage can fullness and location, etc.) may have a relatively high priority, while data from other sources (e.g., street cameras, user devices, etc.) might have a relatively low priority. Also for example, in an example scenario in which a Mobile AP is on-board a public transportation vehicle, data from sources associated with vehicle and/or passenger safety may have a relatively high priority (in general), while data from other sources (e.g., outdoor temperature sensors, street cameras, etc.) may have a relatively low priority.

The data collection plan may additionally, for example, be based at least in part on time of day, day of the week, type of day, etc. For example, during rush hour, data collection resources may be allocated toward traffic management sensor systems and away from garbage can sensors. In another example scenario, when gathering data on a day prior to a waste pick-up data for garbage, data collection resources may be allocated to garbage can sensor collection as a high priority. As discussed herein, historical data may be utilized when developing the data collection plan, which may be correlated to time-of-day, day-of-week, type-of-day, etc.

The data collection plan may additionally, for example, be based at least in part on importance of data accuracy (e.g., level of redundancy, amount of replication, etc.). For example, in an example scenario in which data accuracy is particularly important, a data collection plan may be established that utilizes multiple data collecting nodes (e.g., Mobile APs, etc.) to collect the same data from a source, in a redundant manner. Also for example, in a scenario in which data errors are generally acceptable, the data collection plan may generally specify that only one Mobile AP shall attempt to collect the data and/or only make one attempt per day at collecting the data.

The data collection plan may further, for example, be based at least in part on load-balancing. For example, an overall goal for the data collection plan (or strategy) may be to maintain each data collecting node operating in a state that is comfortably within its capability, for example to maintain the ability of each data collecting node to increase its performance in response to real-time events and/or other changing or unexpected conditions.

The previous discussion generally addressed the determination of the data collection plan in terms of the allocation of data collection responsibilities among the data collecting nodes. Any or all of the previously discussed factors may be analyzed to determine the characteristics of the collected data, the frequency (or regularity) with which such data is collected, whether the data is going to be presently collected, etc.

For example, in any of the example scenarios discussed herein, if it is determined that a data collecting node does not have the resources available to collect all of the data desired for a collection (or cost function analysis determines that all of the necessary resources to collect all of the data should not presently be allocated to such collection), the characteristics of the collected data may be altered for the data collection strategy. For example, the resolution of the data may be modified (e.g., utilizing a lower number of bits to represent data values, utilizing a lower number of video blocks or pixels, etc.). Also for example, a type of data encoding may be modified (e.g., switching from a lossless to a lossy encoding strategy, switching from a lossy to a more lossy encoding strategy, utilizing error detection codes instead of error correction codes, eliminating error correction and detection codes, etc.). Additionally for example, the temporal resolution of the data may be altered. For example, a lower number of camera and/or audio frames may be collected.

In general, block 810 comprises determining a data collection plan (or strategy) for a node. Accordingly, the scope of various aspects of this disclosure should not be limited by characteristics of any particular manner of determining a data collection plan. Note that in various other example implementations, a node may collect (or gather) data in a completely reactive manner, for example collecting data whenever a source of data (e.g., a sensor) is encountered for which data should be gathered.

The example method 800 may, at block 820, comprise collecting (or gathering) data from various sources (e.g., any of a variety of sensors, examples of which were presented herein). Block 820 may, for example at least initially, comprise collecting data from the data sources in accordance with a known and/or predictable strategy. Such collecting of data may be performed in any or a variety of manners. For example, various non-limiting examples of such data collection (e.g., including but not limited to communication between Mobile APs and data sources) are provided in U.S. Provisional Application No. 62/222,135, titled "SYSTEMS AND METHODS FOR COLLECTING SENSOR DATA IN A NETWORK OF MOVING THINGS," filed on Sep. 22, 2015, the entire contents of which are hereby incorporated by reference.

Block 820 may, for example, comprise immediately communicating, storing, and/or processing the collected data. For example, block 820 may comprise immediately communicating time-sensitive data to a recipient. Such a recipient may, for example, comprise an application executing at the node, an application executing at another node (e.g., a server in the Cloud, a network controller, a network dashboard application, etc.). In an example scenario in which the collected data is somewhat delay tolerant, block 820 may comprise storing such collected data in a memory and communicating such collected data to a recipient when convenient (e.g., when communication bandwidth is freely available, etc.). In another example scenario in which the collected data is delay tolerant with no significant real-time communication needs, block 820 may comprise storing the collected data in a memory for communication substantially later (e.g., when a vehicle reports back to a garage or station, etc.). In general, block 820 may comprise communicating and/or storing the collected data. Accordingly, the scope of this disclosure should not be limited by characteristics of any particular manner of performing such communication and/or storing.

Block 820 may also, for example, comprise performing any of a variety of types of processing on the collected data. For example, block 820 may comprise processing collected sensor data to determine various metrics, where for example such metrics may be communicated rather than or in addition to the raw collected data. Also for example, block 820 may comprise compressing raw sensor data for efficient communication via the communication network infrastructure. Additionally for example, block 820 may comprise performing error correction and/or detection on the collected data. In an example scenario, block 820 may comprise determining whether the data was adequately collected, for example determining whether the node should make another attempt and/or request another node to make another attempt. In general, block 820 may comprise processing collected data. Accordingly, the scope of this disclosure should not be limited by characteristics of any particular manner of performing such processing.

The example method 800 may, at flow control block 830, comprise determining whether the data collection has been completed. If so, then block 830 may direct execution flow of the example method 800 to block 895 for continued operation. If not, then block 830 may direct execution flow of the example method 800 to block 840.

At block 840, the example method 800 may comprise determining if any detected condition and/or event has occurred that may warrant a change in the data collection plan (or strategy). Any of a variety of conditions may, for example, justify modification of the data collection plan, many non-limiting examples of which are provided herein.

As discussed herein, though not necessary in all examples, one or more data collecting nodes (e.g., Mobile APs, Fixed APs, AP client devices, etc.) may operate in accordance with a data collection plan that is relatively stable. The data collection environment may, however, have changed. For example, many example factors on which a data collection strategy may be developed are discussed herein. Any of such factors may change, sometimes without notice. Data collection systems and methods in accordance with various aspects of this disclosure may flexibly react to changing conditions and/or conditions being different than expected. Note that other factors, for example most emergency events, might not be predictable and thus might not be considered in developing various data collection plans.

At block 840, a changing or unexpected condition may be detected in any of a variety of manners. For example, a data collecting node operating in accordance with the example method 800 may detect a condition, another data collecting node may detect a condition and communicate this to the data collecting node (or another node), the data collecting node may receive a signal from any of a variety of sources indicating that a condition has changed, etc. Though many examples are presented herein, the scope of this disclosure is not limited by characteristics of such examples. In an example implementation, block 840 may comprise receiving information of various detected conditions from any sensor, from a driver (e.g., human or autonomous vehicle control system), from an OBD system, from another node of the network, etc.

Figure 10:
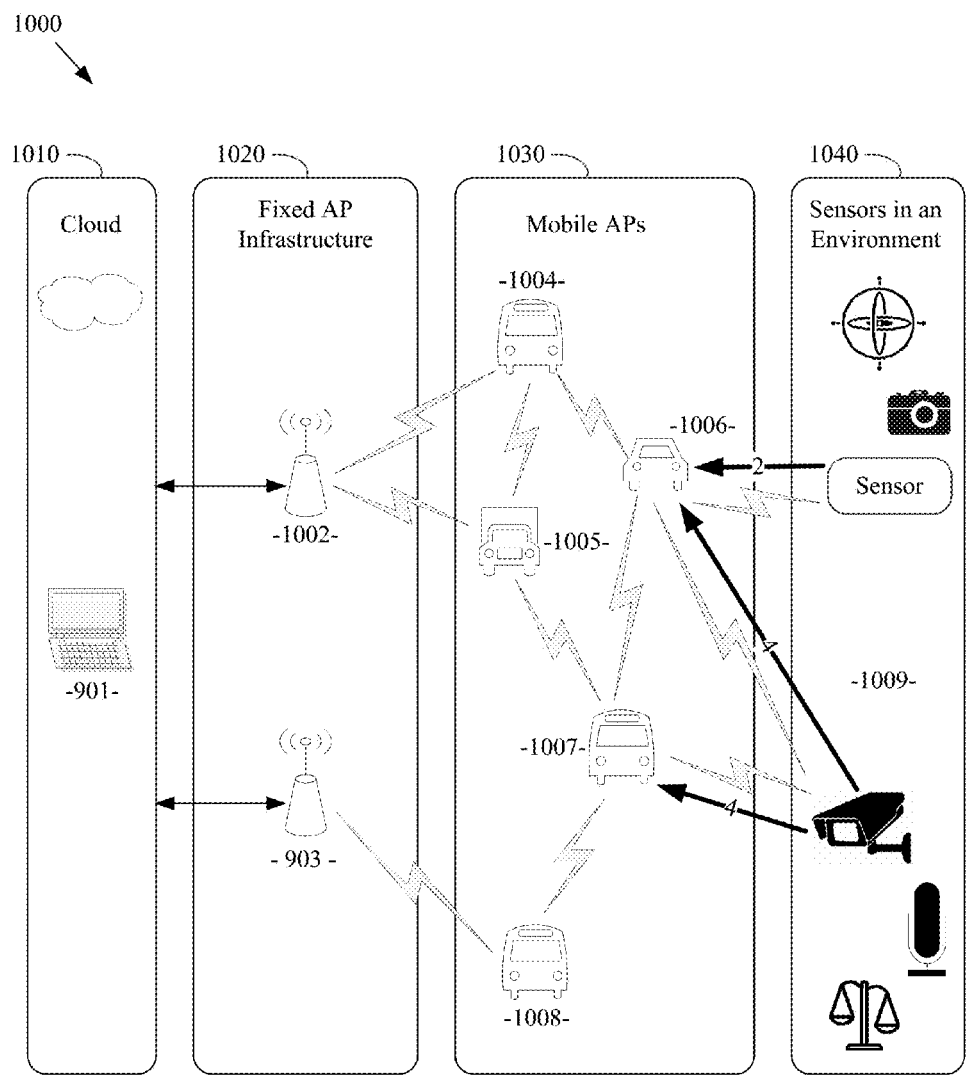
FIG. 10 shows a block diagram of an example AP system for interfacing with a sensor system, in accordance with various aspects of the present disclosure.

An example condition may, for example, comprise the occurrence of an emergency situation. For example, block 840 may comprise receiving an indication that an emergency condition exists and that the data collection plan may need to be modified. For example, in a public safety emergency, the priority of street camera information (at least in a particular geographic area) may be elevated to the highest level and other data collection may be de-prioritized. In such a scenario, it may be determined at block 810 that all or a substantial portion of a Mobile AP's data collection, processing, and/or communication resources are to be dedicated to the collection and communication of street camera information to the Cloud (e.g., to an emergency services command center). Also for example, in an example scenario in which a serious automobile accident occurs, it may be determined (e.g., at block 810) that camera and microphone sensor information in a one-block radius of the accident, and/or along emergency vehicle routes to and from the accident take precedence over all other types of data presently being or planned to be collected. In such a scenario, it may be determined at block 810 that since the Mobile AP is in or near the geographical area in which the camera and microphone sensor information has been elevated to high-priority status, the Mobile AP must dedicate all or a substantial portion of its resources to the collection and communication of sensor information from cameras and/or sensors within range. FIG. 10 provides an illustration, for example in comparison to FIG. 9, in which the camera sensor has been elevated in priority relative to other sensors and is communicating data to multiple Mobile APs. For example, as shown in the labeled wireless communication links in FIG. 9, the respective data gathering associated with the camera sensor and with another sensor are at a same priority. As shown in the labeled wireless communication links in FIG. 10, however, the data gathering associated with the camera sensor has a higher priority than the data gathering associated with the other sensor. This relative prioritization is adaptable based on real time conditions.

Another example of an emergency condition may include an operator of a vehicle (e.g., a local human operator, an autonomous vehicle control system, a remote human operator, etc.) associated with the Mobile AP pressing an emergency button (or generating an emergency signal), for example because of a detected accident, a crime, a public safety situation, etc. In such a scenario, block 840 may direct execution flow of the example method 800 to block 810 at which the data collection strategy may at least temporarily be modified to emphasize the collection and/or communication of sensor data associated with the vehicle (e.g., vehicle operational sensors, vehicle cameras and/or microphones, sensors within range of the vehicle, sensors of user devices within or within the range of the vehicle, etc.). Additionally, person-to-person communication resources between the vehicle operator and a command center may similarly be designated high-priority, as communication resources between an automated vehicle control system and a command center or central controller.

Another example of a real-time condition that may cause modification to a data collection plan includes a detected traffic jam (e.g., a high degree of vehicle density in an area, a low amount of vehicle movement, etc.). For example, detected bad traffic conditions may increase the priority of traffic sensors (e.g., camera sensors, emission sensors, intersection vehicle sensors, noise sensors, radar sensors, etc.).

It is reiterated that the conditions (e.g., bad traffic conditions, etc.) need not be detected by a particular node operating in accordance with the example method 800. Such conditions may be detected by any node in the network, including infrastructure nodes, access points, AP client devices, sensor systems in communication with the network, government command centers, etc. For example, such information may be propagated to the node or nodes that manage the data collection strategy (e.g., to an individual node, to a set of nodes determining data collection strategy together, to a central controller determining data collection strategy, etc.).

Another example condition may, for example, include a weather condition. For example, when a severe weather condition is detected (e.g., detected by a weather sensor in communication with a node of the network, detected by receiving a message from a weather service, etc.), weather and/or driving condition sensor data may receive a heightened prioritization. For example, in a scenario in which freezing rain has been detected or is forecast, a data collection plan (or strategy) may prioritize the collection of data from slippage detection sensors, accident detection sensors, temperature and/or precipitation sensors, etc. Also for example in a scenario in which a tornado warning has been issued, a data collection plan may prioritize the collection of data from temperature and pressure sensors, from sky cameras, etc.

A further example condition may, for example, include poor road conditions. For example, when one or more vehicles carrying Mobile APs detect slippery road conditions, excessively large pot holes, etc., a data collection plan may for example prioritize the collection of sensors associated with road conditions (e.g., vehicle tire slippage detectors, shock sensors or accelerometers, position sensors, etc.).

An example condition may, for example, include detection of an unexpected data source. For example, when a data collecting node encounters an unexpected data source that is in need of servicing, such an encounter may result in a modification to the data collection plan (e.g., which might have been developed without considering the unexpected data source). For example, a new camera, new set of waste sensors, new set of environmental sensors, etc. may have been installed along a route traversed by a public transportation vehicle carrying a Mobile AP that collects sensor data. If collecting data from the newly detected sensors has a substantial impact on the resource utilization of the Mobile AP, a new data collection plan (e.g., in which at least some of the data gathering responsibilities of the Mobile AP are transferred to another AP, in which data collection for the new sensor is assigned to another Mobile AP, etc.) may be formed.

Another example condition may, for example, include an unexpected amount of data, for example from a known data source. For example, a data collection plan (or strategy) may have been developed expecting a particular amount of data from a particular data source. During the processing of collected data from the source, a data collecting node may determine that the data source (e.g., a security camera, traffic monitor, etc.) has substantially more data to communicate than expected. In such an example scenario, execution of the example method 800 may flow from block 840 to block 810, at which the data collection plan (e.g., for the data collecting node and/or other data collecting nodes) may be modified.

Still another example condition may, for example, include a changing time constraint associated with a type of data. For example, a data collection plan may have been developed assuming that data from a sensor is delay-tolerant. Conditions may, for example, have changed such that the data has been characterized as time critical and in need of immediate communication, taking priority over other information that is also in need of communication. In such an example scenario, block 810 may comprise adjusting the data collection plan in any of a variety of manners (e.g., modifying an amount of other data to be communicated, shifting data collecting and/or communication responsibilities to other data collecting nodes that have the necessary collecting and/or communication resources, sharing the data collection responsibilities between a plurality of nodes, etc.).

An example condition may, for example, include detected vehicle conditions (e.g., by on-board diagnostic sensors, etc.). For example, in an example scenario in which data associated with on-board diagnostic sensors is generally gathered and communicated at a low rate, detection of an anomaly in the operation of the vehicle in which a Mobile AP is carried may cause data collection priorities to emphasize collection and communication of vehicle sensor data (e.g., to a diagnostic center for analysis to determine whether a replacement vehicle should be preemptively prepared and dispatched, to schedule vehicle maintenance activities, etc.). In such a scenario, other data collections that are being performed or were going to be performed by the vehicle may be transitioned to other vehicles.

Another example condition may, for example, include a different client count and/or different client resource utilization than expected. For example, in an example scenario in which a public transportation vehicle typically services a particular number of clients utilizing a particular amount of communication bandwidth, a surge in such utilization may adversely impact a Mobile AP's ability to gather and/or communicate sensor data. In such a scenario, data collection responsibilities may be transferred to other Mobile APs, the bandwidth allocated to public utilization versus sensor data gathering may be adjusted, etc.

Yet another example condition may, for example, include a failure in one or more nodes (e.g., a data collection node, intermediate communication node, etc.) of the system. For example, in an example in which a Mobile AP of a vehicle has apparently failed and/or an intermediate communication node between such Mobile AP and a destination for the collected data has failed, another Mobile AP and/or a central controller may determine that the failure has occurred, and shift the data collection responsibilities for the Mobile AP to one or more other Mobile APs, adjust the characteristics of the data to be gathered to reduce the resource burden on the other Mobile APs if necessary, etc.

Another example may, for example, include detected data congestion in the network. For example, a data collection plan may have been developed assuming (e.g., based on historical data rates) a particular data rate for communicating camera sensor data upstream to a traffic control system. In an example scenario in which the actual data rate (e.g., due to network congestion, node failures, etc.) is substantially less than expected, the ability for the data collecting node to communicate the collected data and/or other data may be substantially decreased, resulting in inadequate quality of the data collection service. In response to a detected communication issue, the data collection plan may be modified, for example utilizing different data pathways, shifting communication responsibilities or pathways to other nodes, etc.

Many of the examples present herein include the shifting of data gathering and/or communication responsibilities from a first data collecting node to one or more other data gathering nodes. In any of such scenarios, a decision may also be made to simply skip a particular data collection, which may be performed at a later time and/or by a different data collecting node. Other examples discussed herein included the determination that collecting and/or communicating at a reduced resolution may be acceptable, at least temporarily. In any of the scenarios discussed herein, instead of (or in addition to) shifting data gathering and/or communicating responsibilities to another node, particular data gathering responsibilities for the data collecting node may be reduced in magnitude by adjusting the resolution (e.g., value resolution, temporal resolution, etc.) of the particular data being collected. Note that such adjusting may include the Mobile AP communicating with the sensor to adjust the data being sent by the data source, for example instead of the Mobile AP ignoring data that is communicated by the source.

Though many examples of detected conditions have been presented herein, as well as many example responses to such conditions, the scope of this disclosure is not limited to such examples.

Note that although block 840 (and other blocks) of the example method 800 are shown in particular locations in the example flow diagram, the scope of this disclosure is not limited to such flow order. For example, the functionality of block 840 may be performed at any time (e.g., in response to a detected condition or event, etc.).

If, at block 830, it is determined that the data collection is complete, then execution of the example method 800 flows to block 895 for continued operation. Such continued operation may comprise any of a variety of characteristics. For example, block 895 may comprise directing execution flow of the example method 800 to any previous block (or portion thereof) and/or any other method block (or portion thereof) discussed herein. Also for example, block 895 may comprise communicating information describing the difference between an originally planned data collection session and an actually implemented data collection session to one or more other nodes of the system, for example for system model updating, etc.

As discussed herein, any one or more of a variety of nodes (e.g., Mobile APs, Fixed APs, central controllers, Cloud-based applications, data collection application, network dashboard applications, etc.) may operate to determine data collecting plans (or strategies) for one or more nodes in the network. The following example is presented in the context of a single node, which may for example be a central controller or Cloud-based application, which serves as a destination for collected data and also as a central planner for the data collection activities for the network. Though this example is presented in such context, it should be understood that the example may be implemented in a distributed manner by a plurality of different nodes or servers or applications.

Figure 11:
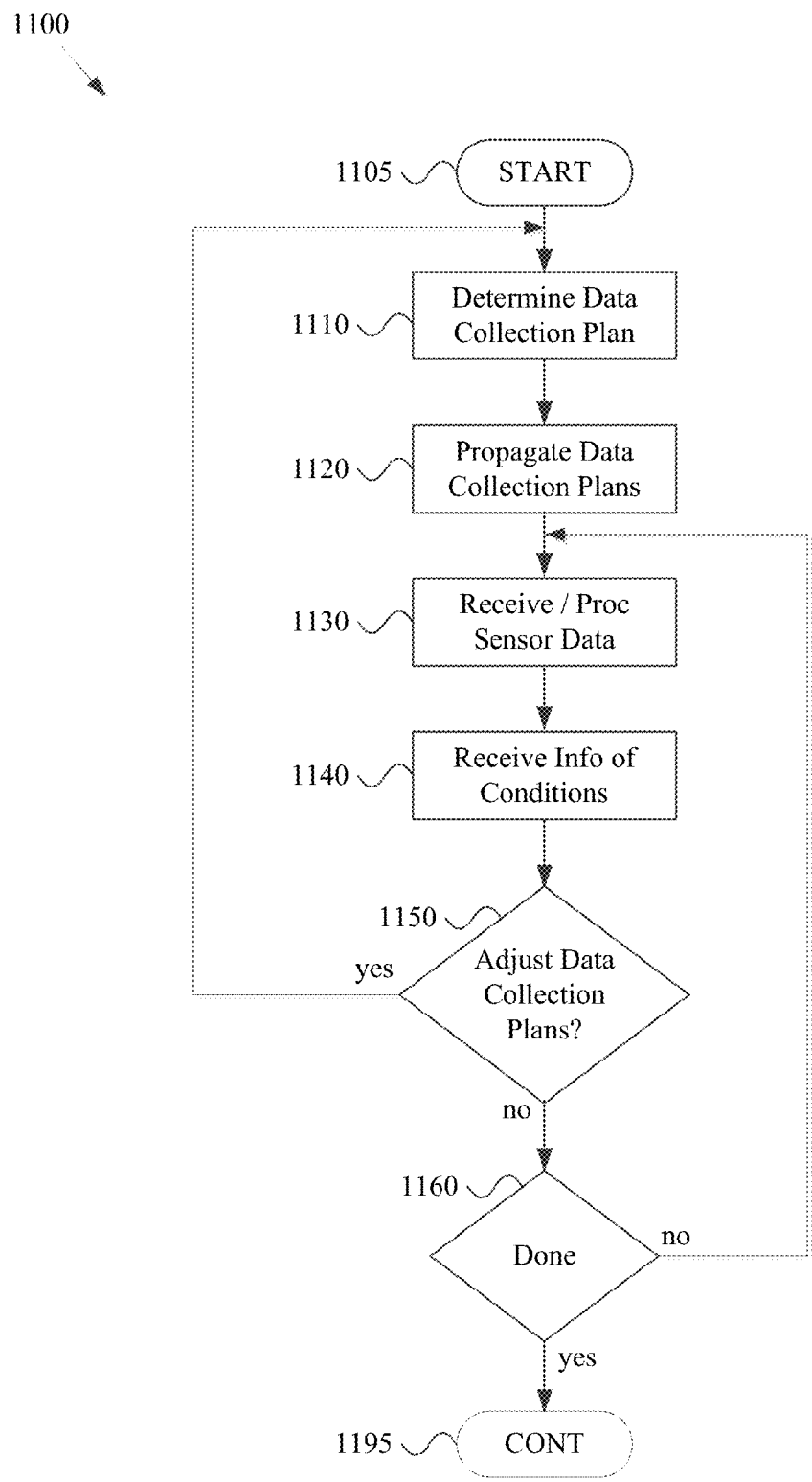
FIG. 11 shows a flow diagram of an example method of collecting data in a network of moving things, in accordance with various aspects of the present disclosure.

FIG. 11 shows a flow diagram of an example method 1100 of collecting data in a network of moving things, in accordance with various aspects of the present disclosure. The example method 1100 may, for example, share any or all characteristics with any other methods discussed herein (e.g., the example method 800 shown in FIG. 8 and discussed herein, etc.). Also, any or all portions of the example method 1100 may, for example, be implemented by any of the network nodes discussed herein (e.g., a Mobile AP node or OBU, a Fixed AP node or RSU, any network infrastructure node, a Cloud server, an AP client device, a mobile user device, etc.). In an example implementation, the example method 1100 may be implemented by one or more central data collection controller applications being run by one or more servers in the Cloud.

The example method 1100 may, for example, begin executing at block 1105. The example method 1100 may begin executing in response to any of a variety of causes or conditions. For example, the method 1100 may begin executing in preparation for any vehicle comprising a Mobile AP beginning a route or shift. Also for example, the method 1100 may begin executing on a timed schedule (e.g., an absolute start and/or update time, periodically with a consistent and/or varying period, etc.), in response to a user command, while a vehicle is being maintained or most vehicles in a fleet are being maintained, while a vehicle is parked in a garage or most vehicles in a fleet are parked in a garage, in response to a power-up condition, in response to an engine starting, in response to one or more vehicles beginning to move, in response to a signal received from another application, etc. The example method 1100 may, for example, continually execute. Accordingly, the scope of this disclosure is not limited by characteristics of any particular initiating cause or condition.

The example method 1100 may, at block 1110, comprise determining a data collection plan. Block 1110 may, for example, share any or all characteristics with the example block 810 discussed herein. Block 1110 may, for example, determine a data collection plan based on any or all of the factors discussed herein. In an example implementation, block 1110 may comprise determining a data collection plan for all Mobile APs (and/or other nodes or devices) in the network that have data collection capability. Also for example, block 1110 may comprise determining a data collection plan for all data collecting nodes of a particular fleet (e.g., a bus fleet, a waste management fleet, an emergency services fleet, a harbor fleet, etc.).

At block 1120, the example method 1100 may comprise propagating one or more data collection plans. Block 1120 may comprise propagating the data collection plan(s) in any of a variety of manners. For example, block 1120 may comprise communicating individual data collection plans to respective data collecting nodes in a unicast manner. Also for example, block 1120 may comprise communicating a data collection plan for all data collecting nodes in a fleet of vehicles to a fleet controller node (or application), which may then be distributed by one or more other nodes.

Block 1120 may, for example, comprise distributing data collection plans in a push or pull manner. For example, in an example scenario, upon startup of a Mobile AP (e.g., a vehicle being prepared for operating a shift, a Mobile AP reset or reboot, a timer expiration, etc.), a Mobile AP may request a data collection plan from a server (or database) of such plans. Block 1120 may then comprise responding to such a request. In another example scenario, block 1120 may comprise propagating the data collection plans without being requested to do so (e.g., periodically, at a scheduled time, when a data collection plan has changed, etc.).

In an example implementation in which the data collection plan is continually adapting, a change in a data collection plan (or a portion thereof) may trigger immediate propagation of the data collection plan to those data collecting nodes affected by the change. Such plan updating may, for example, occur periodically (e.g., hourly, daily, etc.) or may occur in real-time as a change is made. For example, in a scenario in which a data collection plan is adjusted in response to a real-time detected condition, many examples of which are provided herein, block 1110 may comprise modifying a data collection plan for one or more data collecting nodes and immediately distributing the modified data collection plan to the affected data collecting nodes.

In general, block 1120 may comprise propagating a data collection plan. Accordingly, the scope of this disclosure is not limited by characteristics of any particular manner of performing such propagation.

The example method 1100 may, for example at block 1130, comprise receiving and/or processing collected data from the data collecting nodes. In an example implementation, a node implementing the example method 1100 may manage data collection planning and/or overall data collecting. In an example scenario in which the method 1100 comprises managing data collection planning and also receiving the collected data, the method 1100 may comprise monitoring the overall performance of the data collection system, for example determining whether the data collecting nodes are performing according to plan and making adjustments to the data collection plan if necessary.

The example method 1100 may, for example at block 1140, comprise receiving information of conditions (or factors) related to the data collection process (e.g., related to data source or sensor operation, network operation, environmental context, etc.). Many examples of such conditions are provided herein, for example in the discussion of the example method 800 of FIG. 8, etc.). For example and without limitation, such information may comprise information about any one or more of: vehicle information (e.g., location, vehicle velocity, vehicle route, vehicle operational health, etc.), sensor information (e.g., sensor location, sensor data communication needs, sensor communication capabilities, etc.), time information, day information, network topology information, noise source information, information of Mobile AP operating conditions and/or resource availability, information of data priority, information of data accuracy needs, information of data resolution requirements, information of data collection time constraints, information of load balancing, information of node resource availability, emergency information, traffic density information, traffic road condition information, weather information, information regarding an unexpected data source, information about an expected data source not found, information regarding amount of data from a source, information about client numbers and/or bandwidth utilization, information about network node failure and/or underperformance, information about data congestion, information about nodes autonomously and/or in conjunction with peer nodes adapting data collecting responsibilities, etc.

At block 1150, the example method 1100 may comprise determining whether any of the received sensor data and/or any of the received information of conditions warrants a change in the data collection plan (e.g., an immediate real-time change, a non-time-critical change, etc.). If it is determined at block 1150 that a change in the data collection plan is immediately warranted (e.g., in response to an emergency condition, in response to a condition that causes immediate need of particular information, etc.), then execution of the example method 1100 flows back up to block 1110 for a re-determination of the data collection plan.

If no change (or no immediate change) to the data collection plan is warranted, then execution of the example method 1100 may proceed to block 1160 for the continued collection of data by the system. Note that in a scenario in which a change to the data collection plan is warranted, but not immediately warranted, execution flow of the method 1100 may return to block 1110 at a later time (e.g., during off hours, between shifts, etc.) for a redetermination of the data collection plan (or strategy).

At block 1160, if it is determined that there remains data to be collected in accordance with the data collection plan, then execution flow of the example method 1100 returns to block 1130 for the continued receiving of collected data and/or information of conditions. If it is determined that the data collection has completed, then execution flow of the example method 1100 proceeds to block 1195 for continued operation.

Such continued operation may comprise any of a variety of characteristics. For example, block 1195 may comprise directing execution flow of the example method 1100 to any previous block (e.g., block 1110 for a redetermination of data collection plan based on recent events, etc.). Also for example, block 1195 may comprise analyzing various types of information (e.g., collected data, system performance information, customer feedback, information of the detected conditions, historical information, etc.) to adjust one or more models on which the determined collection plan is based.

Such adaptive modeling may, for example, be useful to determine whether detected anomalies are not anomalies at all, but are actually modified or previously unknown aspects of the system or operating environment that should now be expected as the norm and included in upfront planning, rather than being reacted to. For example, changing network or sensor topology, traffic adjustments based on construction projects, waste container movement, a consistent change in communication link bandwidth, vehicle scheduling changes, etc., may all justify model changes.

As explained herein, the example methods may be performed in one or more of any of a variety of network nodes. A non-limiting example of a network and/or node implementation is provided at FIG. 12.

Figure 12:
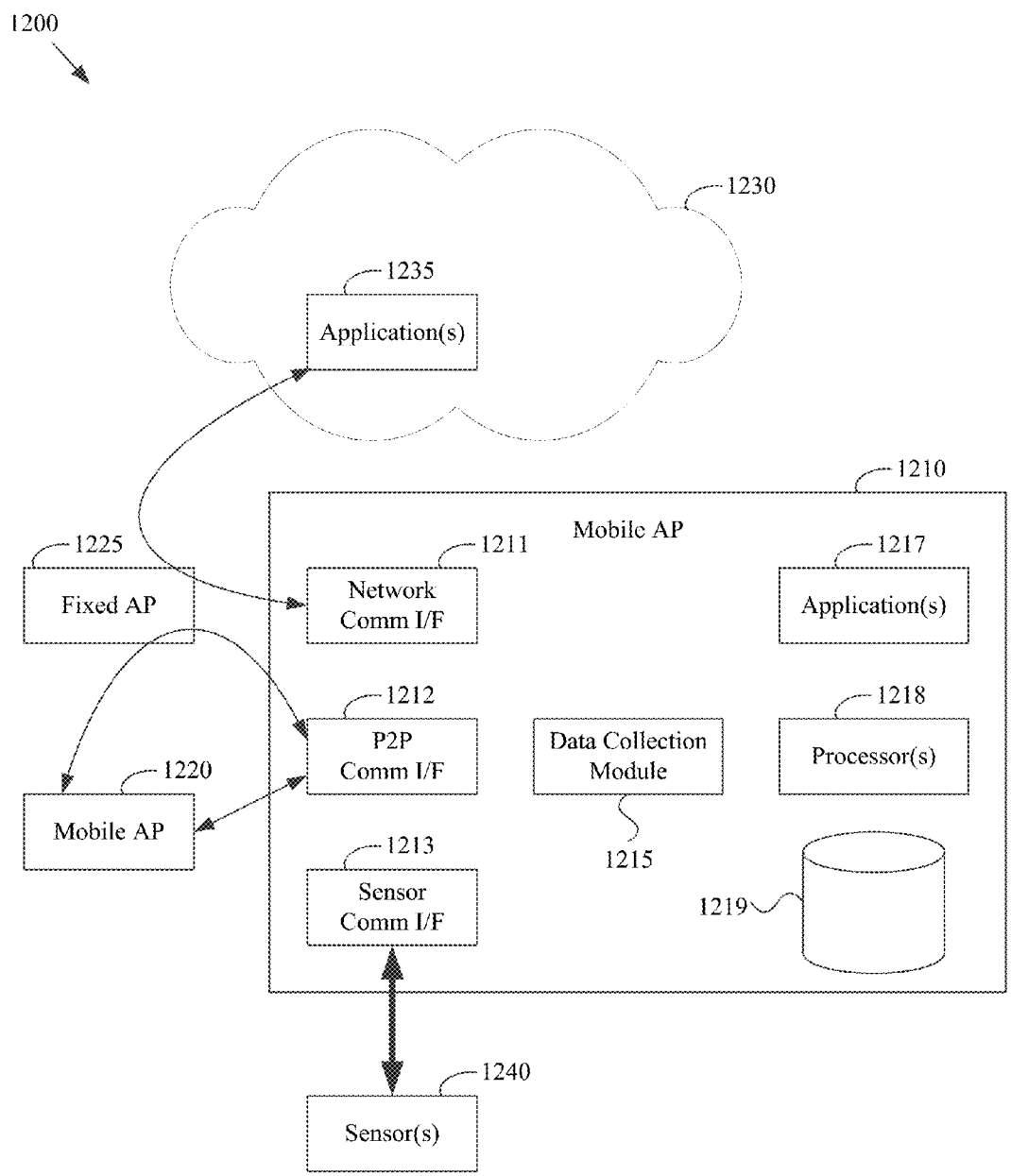
FIG. 12 shows a block diagram of various components of an example communication network, in accordance with various aspects of the present disclosure

FIG. 12 shows a block diagram of various components of an example communication network 1200 (e.g., a network of moving things) for interfacing with a sensor system, in accordance with various aspects of the present disclosure. The example network 1200 may, for example, share any or all characteristics with the other networks discussed herein (e.g., networks 100, 200, 300, 400, 500-570, 600, 700, 900, 1000, 1100, 1200, etc.). Any or all of the components of the example network 1200 may perform any or all of the method steps presented herein (e.g., of the methods 800, 1100, etc.).

The example network 1200 comprises a Cloud 1230, which in turn may comprise any of a variety of servers and/or nodes executing applications. An example Cloud-based Application 1235, or a plurality thereof, is shown. In an example implementation, the Application(s) 1235 may operate in accordance with the example method 1100 of FIG. 11. For example, one or more memory devices of a Cloud computer or server may, for example, comprise a non-transitory computer-readable medium that comprises software instructions that when executed by one or more processors, cause the Cloud computer or server to perform any or all of the functionality discussed herein (e.g., with regard to the example methods 800 and 1100 discussed herein, etc.).

The example network 1200 also comprises a Mobile AP 1210, a second Mobile AP 1220, and a Fixed AP 1225. The example network 1200 further comprises one or more sensors 1240.

The example Mobile AP 1210 comprises a Network Communication Interface (I/F) Module 1211 that is operable to communicate with a communication network (e.g., infrastructure components, Cloud components, Fixed APs, etc.). The Network Comm I/F Module 1211 may, for example, operate to communicate in accordance with any of a variety of communication protocols (e.g., 802.11p, cellular, etc.). In an example scenario, the Mobile AP 1210 utilizes the Network Comm I/F Module 1211 to communicate with a server in the Cloud 1230 that is operating in accordance with the Cloud-based Application(s) 1235. The Network Comm I/F Module 1211 may, for example, communicate with such server via a Fixed AP 1225 and/or any of a variety of intermediate nodes. For example, any of the example communication discussed herein between a Mobile AP and a Fixed AP, network infrastructure node, Cloud component, etc., may be performed utilizing the Network Comm I/F Module 1211.

The example Mobile AP 1210 comprises a Peer-to-Peer (P2P) Communication Interface (I/F) Module 1212 that is operable to communicate with peer nodes (e.g., Mobile APs, etc.). The P2P Comm I/F Module 1212 may, for example, operate to communicate in accordance with any of a variety of communication protocols (e.g., 802.11p, cellular, Wi-Fi, etc.). In an example scenario, the Mobile AP 1210 utilizes the P2P Comm I/F Module 1212 to communicate with one or more other Mobile APs (and/or Fixed APs) in the network 1200. The P2P Comm I/F Module 1212 may, for example, communicate with a peer node 1220 directly, via an intermediate Fixed AP 1225, via any one or more of a variety of intermediate nodes, etc. For example, any of the example communication discussed herein between a Mobile AP and another Mobile AP, etc., may be performed utilizing the P2P Comm I/F Module 1212.

The example Mobile AP 1210 comprises a Sensor Communication Interface (I/F) Module 1213 that is operable to communicate with data sources (e.g., sensor systems, general data sources, etc.). The Sensor Comm I/F Module 1213 may, for example, operate to communicate in accordance with any of a variety of communication protocols (e.g., Wi-Fi, Bluetooth, UWB, cellular, wired interface, etc.). In an example scenario, the Mobile AP 1210 utilizes the Sensor Comm I/F Module 1213 to communicate with one or more other data sources (e.g., sensors, general data sources, etc.) in the network 1200. The Sensor Comm I/F Module 1213 may, for example, communicate with a sensor directly, via any one or more of a variety of intermediate nodes, etc. For example, any of the example communication discussed herein between a Mobile AP and a sensor system, etc., may be performed utilizing the Sensor Comm I/F Module 1213.

Though not shown in FIG. 12, a Mobile AP may also, for example, comprise a client communication interface module utilized to perform or manage communication between the Mobile AP and any of a variety of client devices (e.g., user devices, etc.).

The example Mobile AP 1210 comprises a Data Collection Module 1215 that is operable to manage the collection of sensor (and other) data. The Data Collection Module 1215 may, for example, operate to determine and/or implement a data collection plan as discussed herein at the node level. For example, the Data Collection Module 1215 may utilize any or all of the example communication interface modules 1211, 1212, and 1213 to perform desired communications. The Data Collection Module 1215 may, for example in various scenarios, operate to receive a data collection plan, form a data collection plan (e.g., autonomously or in conjunction with other nodes, etc.), modify a data collection plan, etc. In an example implementation, the Data Collection Module 1215 may operate in accordance with the example method 800 of FIG. 8.

The example Mobile AP 1210 may also comprise one or more Applications 1217. Such Applications may, for example, request and/or utilize sensor data that is collected by the Data Collection Module 1215. In an example scenario, an Application 1217 may comprise an on-board application of the Mobile AP 1210 that operates to request and/or receive collected data from the Data Collection Module 1215.

The example Mobile AP 1210 may also comprise one or more Processors 1218 and Memory Devices 1219. The Processor(s) 1218 may, for example, comprise any of a variety of processor characteristics. For example, the Processor(s) 1218 may comprise one or more of a general purposes processor, RIS processor, microcontroller, ASIC, DSP, video processor, etc. The Memory Device(s) 1219 may, for example comprise any of a variety of memory characteristics. For example, the Memory Device(s) 1219 may comprise a volatile memory, non-volatile memory, etc. The Memory Device(s) 1219 may, for example, comprise a non-transitory computer-readable medium that comprises software instructions that when executed by the Processor(s) 1218, cause the Mobile AP 1210 to perform any or all of the functionality discussed herein (e.g., with regard to the example methods 800 and 1100 discussed herein, etc.).

Note that the second Mobile AP 1220, the Fixed AP 1225, and/or any of a variety of network nodes may comprise configurations that share any or all aspects with the example Mobile AP 1210.

In general, the systems and methods presented herein, in accordance with various aspects of the present disclosure, adapt the rules (or strategy or plan) by which data is gathered. Such adaptability may, for example, be performed in a distributed fashion. For example, the determining plans for collecting data as well as the actual collection of the data may be performed in a distributed manner. In an example implementation, a combination of central control and distributed control of data collection activities may be utilized. In an example implementation, control of data collection activities may be generally completely distributed among the data collecting nodes themselves with a minimal amount of central oversight.

The manner in which data is collected may thus be optimized based on any or a large number of considerations, for example regarding environment, network operation, overall context, individual node contexts, etc. Any or all nodes of the system may provide information relevant to the collection of data by the network nodes.

In a network implementation in accordance with various aspects of the present disclosure, a network of moving things may be utilized as a flexible and efficient backbone for sensor data communication. Such a network may provide the needs of any of a variety of organizations, for example business enterprises, municipalities, infrastructure maintenance organizations, security organizations, etc.

In an example implementation, mobile-to-mobile communication links may be utilized to share control information between nodes, to share collected data between nodes, to share storage, processing, and/or communication responsibilities for such collected data, etc.

In accordance with various aspects of this disclosure, examples of the networks and/or components thereof presented herein are provided in U.S. Provisional Application Ser. No. 62/222,192, titled "Communication Network of Moving Things," filed on Sep. 22, 2015, which is hereby incorporated herein by reference in its entirety.

In accordance with various aspects of this disclosure, the networks and/or components thereof presented herein are provided with systems and methods for integrating such networks and/or components with other networks and systems, non-limiting examples of which are provided in U.S. Provisional Application Ser. No. 62/221,997, titled "Integrated Communication Network for A Network of Moving Things," filed on Sep. 22, 2015, which is hereby incorporated herein by reference in its entirety.

Also, in accordance with various aspects of this disclosure, the networks and/or components thereof presented herein are provided with systems and methods for synchronizing such networks and/or components, non-limiting examples of which are provided in U.S. Provisional Application Ser. No. 62/222,016, titled "Systems and Methods for Synchronizing a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for managing such networks and/or components, non-limiting examples of which are provided in U.S. Provisional Application Ser. No. 62/222,042, titled "Systems and Methods for Managing a Network of Moving Things," filed on Sep. 22, 2015, which is hereby incorporated herein by reference in its entirety.

Further, in accordance with various aspects of this disclosure, the networks and/or components thereof presented herein are provided with systems and methods for monitoring such networks and/or components, non-limiting examples of which are provided in U.S. Provisional Application Ser. No. 62/222,066, titled "Systems and Methods for Monitoring a Network of Moving Things," filed on Sep. 22, 2015, which is hereby incorporated herein by reference in its entirety.

Still further, in accordance with various aspects of this disclosure, the networks and/or components thereof presented herein are provided with systems and methods for detecting and/or classifying anomalies in such networks and/or components, non-limiting examples of which are provided in U.S. Provisional Application Ser. No. 62/222,077, titled "Systems and Methods for Detecting and Classifying Anomalies in a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for managing mobility in such networks and/or components, non-limiting examples of which are provided in U.S. Provisional Application Ser. No. 62/222,098, titled "Systems and Methods for Managing Mobility in a Network of Moving Things," filed on Sep. 22, 2015, which is hereby incorporated herein by reference in its entirety.

Also, in accordance with various aspects of this disclosure, the networks and/or components thereof presented herein are provided with systems and methods for managing connectivity in such networks and/or components, non-limiting examples of which are provided in U.S. Provisional Application Ser. No. 62/222,121, titled "Systems and Methods for Managing Connectivity a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for collecting sensor data in such networks and/or components, non-limiting examples of which are provided in U.S. Provisional Application Ser. No. 62/222,135, titled "Systems and Methods for Collecting Sensor Data in a Network of Moving Things," filed on Sep. 22, 2015, which is hereby incorporated herein by reference in its entirety.

Further, in accordance with various aspects of this disclosure, the networks and/or components thereof presented herein are provided with systems and methods for interfacing with such networks and/or components, non-limiting examples of which are provided in U.S. Provisional Application Ser. No. 62/222,145, titled "Systems and Methods for Interfacing with a Network of Moving Things," filed on Sep. 22, 2015, which is hereby incorporated herein by reference in its entirety.

Still further, in accordance with various aspects of this disclosure, the networks and/or components thereof presented herein are provided with systems and methods for interfacing with a user of such networks and/or components, non-limiting examples of which are provided in U.S. Provisional Application Ser. No. 62/222,150, titled "Systems and Methods for Interfacing with a User of a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for data storage and processing in such networks and/or components, non-limiting examples of which are provided in U.S. Provisional Application Ser. No. 62/222,168, titled "Systems and Methods for Data Storage and Processing for a Network of Moving Things," filed on Sep. 22, 2015, which is hereby incorporated herein by reference in its entirety.

Also, in accordance with various aspects of this disclosure, the networks and/or components thereof presented herein are provided with systems and methods for vehicle traffic management in such networks and/or components, non-limiting examples of which are provided in U.S. Provisional Application Ser. No. 62/222,183, titled "Systems and Methods for Vehicle Traffic Management in a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for environmental management in such networks and/or components, non-limiting examples of which are provided in U.S. Provisional Application Ser. No. 62/222,186, titled "Systems and Methods for Environmental Management in a Network of Moving Things," filed on Sep. 22, 2015, which is hereby incorporated herein by reference in its entirety.

Further, in accordance with various aspects of this disclosure, the networks and/or components thereof presented herein are provided with systems and methods for managing port or shipping operation in such networks and/or components, non-limiting examples of which are provided in U.S. Provisional Application Ser. No. 62/222,190, titled "Systems and Methods for Port Management in a Network of Moving Things," filed on Sep. 22, 2015, which is hereby incorporated herein by reference in its entirety.

Also, in accordance with various aspects of this disclosure, the networks and/or components thereof presented herein are provided with systems and methods for enhancing the accuracy of positioning or location information based at least in part on historical data, non-limiting examples of which are provided in U.S. Provisional Application Ser. No. 62/244,828, titled "Utilizing Historical Data to Correct GPS Data in a Network of Moving Things," filed on Oct. 22, 2015, which is hereby incorporated herein by reference in its entirety.

Additionally, in accordance with various aspects of this disclosure, the networks and/or components thereof presented herein are provided with systems and methods for enhancing the accuracy of position or location of positioning or location information based at least in part on the utilization of anchors, non-limiting examples of which are provided in U.S. Provisional Application Ser. No. 62/244,930, titled "Using Anchors to Correct GPS Data in a Network of Moving Things," filed on Oct. 22, 2015, which is hereby incorporated herein by reference in its entirety.

Further, in accordance with various aspects of this disclosure, the networks and/or components thereof presented herein are provided with systems and methods for providing communication between applications, non-limiting examples of which are provided in U.S. Provisional Application Ser. No. 62/246,368, titled "Systems and Methods for Inter-Application Communication in a Network of Moving Things," filed on Oct. 26, 2015, which is hereby incorporated herein by reference in its entirety.

Still further, in accordance with various aspects of this disclosure, the networks and/or components thereof presented herein are provided with systems and methods for probing, analyzing and/or validating communication, non-limiting examples of which are provided in U.S. Provisional Application Ser. No. 62/246,372, titled "Systems and Methods for Probing and Validating Communication in a Network of Moving Things," filed on Oct. 26, 2015, which is hereby incorporated herein by reference in its entirety.

Yet further, in accordance with various aspects of this disclosure, the networks and/or components thereof presented herein are provided with systems and methods for adapting communication rate, non-limiting examples of which are provided in U.S. Provisional Application Ser. No. 62/250,544, titled "Adaptive Rate Control for Vehicular Networks," filed on Nov. 4, 2015, which is hereby incorporated herein by reference in its entirety.

Also, in accordance with various aspects of this disclosure, the networks and/or components thereof presented herein are provided with systems and methods for reconfiguring and adapting hardware, non-limiting examples of which are provided in U.S. Provisional Application Ser. No. 62/273,878, titled "Systems and Methods for Reconfiguring and Adapting Hardware in a Network of Moving Things," filed on Dec. 31, 2015, which is hereby incorporated herein by reference in its entirety.

Additionally, in accordance with various aspects of this disclosure, the networks and/or components thereof presented herein are provided with systems and methods for optimizing the gathering of data, non-limiting examples of which are provided in U.S. Provisional Application Ser. No. 62/253,249, titled "Systems and Methods for Optimizing Data Gathering in a Network of Moving Things," filed on Nov. 10, 2015, which is hereby incorporated herein by reference in its entirety.

Further, in accordance with various aspects of this disclosure, the networks and/or components thereof presented herein are provided with systems and methods for performing delay tolerant networking, non-limiting examples of which are provided in U.S. Provisional Application Ser. No. 62/257,421, titled "Systems and Methods for Delay Tolerant Networking in a Network of Moving Things," filed on Nov. 19, 2015, which is hereby incorporated herein by reference in its entirety.

Still further, in accordance with various aspects of this disclosure, the networks and/or components thereof presented herein are provided with systems and methods for improving the coverage and throughput of mobile access points, non-limiting examples of which are provided in U.S. Provisional Application Ser. No. 62/265,267, titled "Systems and Methods for Improving Coverage and Throughput of Mobile Access Points in a Network of Moving Things," filed on Dec. 9, 2015, which is hereby incorporated herein by reference in its entirety.

Yet further, in accordance with various aspects of this disclosure, the networks and/or components thereof presented herein are provided with systems and methods for coordinating channel utilization, non-limiting examples of which are provided in U.S. Provisional Application Ser. No. 62/270,858, titled "Channel Coordination in a Network of Moving Things," filed on Dec. 22, 2015, which is hereby incorporated herein by reference in its entirety.

Also, in accordance with various aspects of this disclosure, the networks and/or components thereof presented herein are provided with systems and methods for implementing a network coded mesh network in the network of moving things, non-limiting examples of which are provided in U.S. Provisional Application Ser. No. 62/257,854, titled "Systems and Methods for Network Coded Mesh Networking in a Network of Moving Things," filed on Nov. 20, 2015, which is hereby incorporated herein by reference in its entirety.

Additionally, in accordance with various aspects of this disclosure, the networks and/or components thereof presented herein are provided with systems and methods for improving the coverage of fixed access points, non-limiting examples of which are provided in U.S. Provisional Application Ser. No. 62/260,749, titled "Systems and Methods for Improving Fixed Access Point Coverage in a Network of Moving Things," filed on Nov. 30, 2015, which is hereby incorporated herein by reference in its entirety.

Further, in accordance with various aspects of this disclosure, the networks and/or components thereof presented herein are provided with systems and methods for managing mobility controllers and their network interactions, non-limiting examples of which are provided in U.S. Provisional Application Ser. No. 62/273,715, titled "Systems and Methods for Managing Mobility Controllers and Their Network Interactions in a Network of Moving Things," filed on Dec. 31, 2015, which is hereby incorporated herein by reference in its entirety.

Still further, in accordance with various aspects of this disclosure, the networks and/or components thereof presented herein are provided with systems and methods for managing and/or triggering handovers of mobile access points, non-limiting examples of which are provided in U.S. Provisional Application Ser. No. 62/281,432, titled "Systems and Methods for Managing and Triggering Handovers of Mobile Access Points in a Network of Moving Things," filed on Jan. 21, 2016, which is hereby incorporated herein by reference in its entirety.

Yet further, in accordance with various aspects of this disclosure, the networks and/or components thereof presented herein are provided with systems and methods for performing captive portal-related control and management, non-limiting examples of which are provided in U.S. Provisional Application Ser. No. 62/268,188, titled "Captive Portal-related Control and Management in a Network of Moving Things," filed on Dec. 16, 2015, which is hereby incorporated herein by reference in its entirety.

Also, in accordance with various aspects of this disclosure, the networks and/or components thereof presented herein are provided with systems and methods for extrapolating high-value data, non-limiting examples of which are provided in U.S. Provisional Application Ser. No. 62/270,678, titled "Systems and Methods to Extrapolate High-Value Data from a Network of Moving Things," filed on Dec. 22, 2015, which is hereby incorporated herein by reference in its entirety.

Additionally, in accordance with various aspects of this disclosure, the networks and/or components thereof presented herein are provided with systems and methods for providing remote software updating and distribution, non-limiting examples of which are provided in U.S. Provisional Application Ser. No. 62/272,750, titled "Systems and Methods for Remote Software Update and Distribution in a Network of Moving Things," filed on Dec. 30, 2015, which is hereby incorporated herein by reference in its entirety.

Further, in accordance with various aspects of this disclosure, the networks and/or components thereof presented herein are provided with systems and methods for providing remote configuration updating and distribution, non-limiting examples of which are provided in U.S. Provisional Application Ser. No. 62/278,662, titled "Systems and Methods for Remote Configuration Update and Distribution in a Network of Moving Things," filed on Jan. 14, 2016, which is hereby incorporated herein by reference in its entirety.

Still further, in accordance with various aspects of this disclosure, the networks and/or components thereof presented herein are provided with systems and methods for adapting the network, for example automatically, based on user feedback, non-limiting examples of which are provided in U.S. Provisional Application Ser. No. 62/286,243, titled "Systems and Methods for Adapting a Network of Moving Things Based on User Feedback," filed on Jan. 22, 2016, which is hereby incorporated herein by reference in its entirety.

Yet further, in accordance with various aspects of this disclosure, the networks and/or components thereof presented herein are provided with systems and methods for enhancing and/or guaranteeing data integrity when building or performing data analytics, non-limiting examples of which are provided in U.S. Provisional Application Ser. No. 62/278,764, titled "Systems and Methods to Guarantee Data Integrity When Building Data Analytics in a Network of Moving Things," Jan. 14, 2016, which is hereby incorporated herein by reference in its entirety.

Also, in accordance with various aspects of this disclosure, the networks and/or components thereof presented herein are provided with systems and methods for performing self-initialization and/or automated bootstrapping of mobile access points, non-limiting examples of which are provided in U.S. Provisional Application Ser. No. 62/286,515, titled "Systems and Methods for Self-Initialization and Automated Bootstrapping of Mobile Access Points in a Network of Moving Things," filed on Jan. 25, 2016, which is hereby incorporated herein by reference in its entirety.

Additionally, in accordance with various aspects of this disclosure, the networks and/or components thereof presented herein are provided with systems and methods for managing power supply and/or utilization, non-limiting examples of which are provided in U.S. Provisional Application Ser. No. 62/295,602, titled "Systems and Methods for Power Management in a Network of Moving Things," filed on Feb. 16, 2016, which is hereby incorporated herein by reference in its entirety.

Further, in accordance with various aspects of this disclosure, the networks and/or components thereof presented herein are provided with systems and methods for automating and easing the installation and setup of the infrastructure, non-limiting examples of which are provided in U.S. Provisional Application Ser. No. 62/299,269, titled "Systems and Methods for Automating and Easing the Installation and Setup of the Infrastructure Supporting a Network of Moving Things," filed on Feb. 24, 2016, which is hereby incorporated herein by reference in its entirety.

Though various portions of this disclosure generally discussed the collection of data from data sources, it should be readily understood that the scope of this disclosure also applies to the communication of information to the data sources. For example, any or all of the network components discussed herein may be utilized to share collected data between data sources, to communicate other data (e.g., control or configuration information, program update information, etc.) to the data sources (e.g., sensor systems, etc.), etc. Such reverse communication may also be incorporated into any or all aspects of the data collection (or communication) planning discussed herein.

In summary, various aspects of this disclosure provide systems and methods for optimizing data gathering in a network of moving things. As non-limiting examples, various aspects of this disclosure provide systems and methods for operating sensor systems and collecting data from sensor systems in a network resource-efficient manner. While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

What is claimed is:

1. A communication network mobile access point (MAP) comprising:
  a wireless transceiver; and
  at least one module comprising a processor and memory, wherein the at least one module is operable to, at least:

provide Wireless Local Area Network (WLAN) Access Point services;
determine a first data collection plan comprising a list of sensors from which to collect data during a travel route, wherein the list of sensors comprises a list of sensors that are predicted to be positioned along the travel route;
implement the first data collection plan while traveling along the travel route by, at least in part, operating to utilize the wireless transceiver to collect sensor data while the MAP is traveling along the travel route; and
while implementing the first data collection plan, at least:
detect a condition;
determine, based at least in part on the detected condition, a second data collection plan; and
switch from the first data collection plan to the second data collection plan.

2. The MAP of claim 1, wherein the at least one module is operable to determine the first data collection plan by, at least in part, operating to receive the first data collection plan from a central controller.

3. The MAP of claim 1, wherein the at least one module is operable to determine the first data collection plan by, at least in part, operating to receive the first data collection plan from another mobile access point.

4. The MAP of claim 1, wherein the at least one module is operable to determine the first data collection plan by, at least in part, operating to negotiate with at least one other mobile access point.

5. The MAP of claim 1, wherein the at least one module is operable to detect the condition by, at least in part, operating to interact with an autonomous vehicle control system.

6. The MAP of claim 1, wherein the at least one module is operable to determine the second data collection plan by, at least in part, operating to modify the list of sensors to remove a sensor from which another MAP has collected data.

7. The MAP of claim 1, wherein the detected condition comprises a vehicle condition.

8. The MAP of claim 1, wherein the detected condition comprises a weather condition.

9. The MAP of claim 1, wherein the detected condition comprises a road condition.

10. The MAP of claim 1, wherein the detected condition comprises a communication resource condition comprising a detected shortage of communication resources.

11. The MAP of claim 1, wherein the at least one module is operable to determine the second data collection plan by, at least in part, operating to modify the list of sensors to include a sensor from which another MAP failed to collect data.

12. The MAP of claim 1, wherein the at least one module is operable to determine the second data collection plan by, at least in part, operating to adjust a data resolution associated with a sensor of the list of sensors.

13. The MAP of claim 1, wherein the at least one module is operable to determine the second data collection plan by, at least in part, operating to adjust a priority associated with a sensor of the list of sensors.

14. The MAP of claim 1, wherein the at least one module is operable to report information regarding the MAP switching to the second data collection plan to another network node.

15. A communication network mobile access point (MAP) comprising:
a wireless transceiver; and
at least one module comprising a processor and memory, wherein the at least one module is operable to, at least:
provide Wireless Local Area Network (WLAN) Access Point services;
determine a first data collection plan comprising a list of sensors from which to collect data during a travel route;
implement the first data collection plan while traveling along the travel route by, at least in part, operating to utilize the wireless transceiver to collect sensor data while the MAP is traveling along the travel route;
while implementing the first data collection plan, at least:
communicate information with a second MAP regarding the ability of the MAP and/or the second MAP to collect sensor data from a sensor; and
based at least in part on the communicated information, modify the list of sensors by adding or removing the sensor.

16. The MAP of claim 15, wherein:
prior to communicating the information with the second MAP, the sensor was not on the list of sensors;
the communicated information indicates that the second MAP failed to collect data from the sensor; and
based at least in part on the communicated information, the at least one module is operable to modify the list of sensors by adding the sensor to the list of sensors.

17. The MAP of claim 15, wherein:
prior to communicating the information with the second MAP, the sensor was on the list of sensors;
the communicated information indicates that the MAP failed to collect data from the sensor; and
based at least in part on the communicated information, the at least one module is operable to modify the list of sensors by removing the sensor from the list of sensors.

18. The MAP of claim 15, wherein the at least one module is operable to modify the list of sensors by, at least in part, operating to modify the list of sensors based only on the information communicated with the second MAP, without approval from a central controller.

19. The MAP of claim 15, wherein the communicated information comprises information of resource utilization for the MAP and/or the second MAP, the information of resource utilization comprising information of remaining resource capacity.

20. The MAP of claim 15, wherein the communicated information comprises information indicating whether the second MAP has collected data from a sensor on the list of sensors.

21. A communication network node comprising:
at least one module operable to, at least:
control operation of a plurality of mobile access points (MAPs) of a vehicle communication network;
determine a first data collection plan for a first mobile access point (MAP) of the plurality of MAPs, the first data collection plan comprising a first list of sensors from which to collect data during a first travel route, wherein the first list of sensors comprises a list of sensors that are predicted to be positioned along the first travel route;
communicate the first data collection plan to the first MAP; and
while the first MAP is implementing the first data collection plan, at least:

receive information;
based, at least in part, on the received information, modify the first data collection plan; and
communicate the modified first data collection plan to the first MAP.

22. The communication network node of claim 21, wherein the at least one module is operable to:
determine a second data collection plan for a second mobile access point (MAP) of the plurality of MAPs, the second data collection plan comprising a second list of sensors from which to collect data during a second travel route, wherein the second list of sensors comprises a list of sensors that are predicted to be positioned along the second travel route;
communicate the second data collection plan to the second MAP;
based, at least in part, on the received information, modify the second data collection plan; and
communicate the modified second data collection plan to the second MAP.

23. The communication network node of claim 22, wherein the at least one module is operable to:
modify the first data collection plan by removing a sensor from the first list of sensors; and
modify the second data collection plan by adding the removed sensor to the second list of sensors.

24. The communication network node of claim 21, wherein the at least one module is operable to receive the information by, at least in part, receiving the information from a control system of an autonomous vehicle.

25. The communication network node of claim 21, wherein the received information comprises data collected from the first list of sensors.

26. The communication network node of claim 21, wherein the at least one module is operable to modify the first data collection plan by, at least in part, operating to modify the first list of sensors to remove a sensor from which another MAP has collected data.

27. The communication network node of claim 21, wherein the received information comprises information of weather and/or road conditions.

28. The communication network node of claim 21, wherein the received information comprises vehicle location and velocity information.

* * * * *